(12) United States Patent
Stein

(10) Patent No.: US 10,696,227 B2
(45) Date of Patent: Jun. 30, 2020

(54) DETERMINING A ROAD SURFACE CHARACTERISTIC

(71) Applicant: Mobileye Vision Technologies Ltd., Jerusalem (IL)

(72) Inventor: Gideon Stein, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 15/868,569

(22) Filed: Jan. 11, 2018

(65) Prior Publication Data

US 2018/0194286 A1 Jul. 12, 2018

Related U.S. Application Data

(60) Provisional application No. 62/445,458, filed on Jan. 12, 2017.

(51) Int. Cl.
*B60R 1/00* (2006.01)
*B60G 17/0165* (2006.01)
(Continued)

(52) U.S. Cl.
CPC ............ *B60R 1/00* (2013.01); *B60G 17/0165* (2013.01); *B60W 10/04* (2013.01); *B60W 10/20* (2013.01);
(Continued)

(58) Field of Classification Search
CPC ................ B60R 1/00; B60R 2300/105; B60R 2300/303; G06N 3/04; B60W 10/18; B60W 40/06; B60W 10/22; B60W 30/02; B60W 2720/00; B60W 2550/40; B60W 2550/14; B60W 2550/141; B60W 2550/147;
(Continued)

(56) References Cited

U.S. PATENT DOCUMENTS 9,118,816 B2 8/2015 Stein et al.
9,256,791 B2 2/2016 Stein et al.
(Continued)

FOREIGN PATENT DOCUMENTS

WO WO 2016/130719 A2 8/2016

OTHER PUBLICATIONS

PCT International Search Report and PCT Written Opinion issued by the European Patent Office dated Apr. 30, 2018 in International Application No. PCT/US2018/013372 (16 pages).

*Primary Examiner* — Marnie A Matt
(74) *Attorney, Agent, or Firm* — Finnegan, Henderson, Farabow, Garrett & Dunner LLP

(57) ABSTRACT

Systems and methods are provided for determining a road surface characteristic. In one implementation, a system includes at least one processing device programmed to receive, from at least one camera, at least two images representative of an environment of a vehicle; align at least a portion of the at least two images using estimated motion of the vehicle; provide, to a trained system configured to determine a characteristic of the road surface, at least the aligned portions of the at least two images; receive, from the trained system, the determined characteristic of the road surface; and provide, to a vehicle control system, based on at least the determined characteristic of the road surface, control information for changing at least one setting of the vehicle control system.

25 Claims, 27 Drawing Sheets

(51) Int. Cl.
*B60W 30/02* (2012.01)
*B60W 30/12* (2020.01)
*B60W 10/20* (2006.01)
*B60W 40/064* (2012.01)
*B60W 40/06* (2012.01)
*B60W 30/14* (2006.01)
*G06K 9/00* (2006.01)
*B60W 10/04* (2006.01)
*B60W 10/22* (2006.01)
*G06N 3/04* (2006.01)
*B60W 30/18* (2012.01)
*B60W 50/00* (2006.01)
*G01C 21/34* (2006.01)

(52) U.S. Cl.
CPC .......... *B60W 10/22* (2013.01); *B60W 30/02* (2013.01); *B60W 30/12* (2013.01); *B60W 30/143* (2013.01); *B60W 30/18145* (2013.01); *B60W 40/06* (2013.01); *B60W 40/064* (2013.01); *G06K 9/00791* (2013.01); *G06N 3/04* (2013.01); *B60G 2400/821* (2013.01); *B60G 2401/142* (2013.01); *B60R 2300/105* (2013.01); *B60R 2300/303* (2013.01); *B60W 2050/0088* (2013.01); *B60W 2420/42* (2013.01); *B60W 2552/00* (2020.02); *B60W 2552/05* (2020.02); *B60W 2552/35* (2020.02); *B60W 2556/45* (2020.02); *B60W 2720/00* (2013.01); *G01C 21/34* (2013.01)

(58) Field of Classification Search
CPC ............ G06K 9/00791; B60G 17/0165; B60G 2400/821; B60G 2401/142; G01C 21/34
See application file for complete search history.

(56) References Cited

U.S. PATENT DOCUMENTS

| | | | |
|---|---|---|---|
| 9,297,641 B2 | 3/2016 | Stein | |
| 2010/0098290 A1 | 4/2010 | Zhang et al. | |
| 2013/0085642 A1* | 4/2013 | Dankers | B60T 8/172 701/48 |
| 2013/0141580 A1* | 6/2013 | Stein | H04N 7/18 348/148 |
| 2013/0147957 A1* | 6/2013 | Stein | G01B 11/02 348/148 |
| 2014/0244125 A1* | 8/2014 | Dorum | G01C 21/32 701/70 |
| 2014/0347448 A1 | 11/2014 | Hegemann et al. | |
| 2016/0001780 A1* | 1/2016 | Lee | G06K 9/00791 701/48 |
| 2016/0073048 A1* | 3/2016 | Howe | H04N 5/77 348/144 |
| 2016/0253566 A1* | 9/2016 | Stein | G06K 9/00791 348/148 |
| 2017/0010618 A1* | 1/2017 | Shashua | G01C 21/32 |
| 2017/0076606 A1* | 3/2017 | Gupta | G08G 1/167 |
| 2017/0236011 A1* | 8/2017 | Lakehal-Ayat | B60R 11/04 382/159 |
| 2018/0188027 A1* | 7/2018 | Zhang | G06T 7/11 |

\* cited by examiner

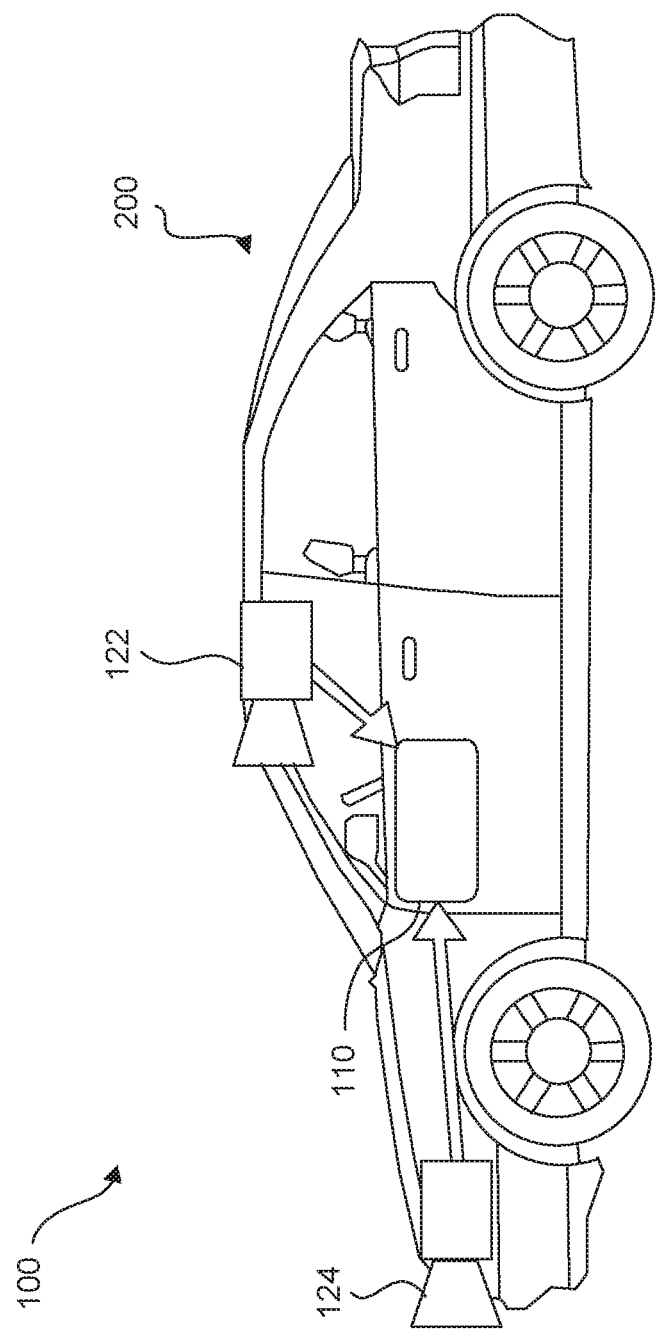

DETERMINING A ROAD SURFACE CHARACTERISTIC

CROSS REFERENCE TO RELATED APPLICATION

This application claims the benefit of priority of U.S. Provisional Patent Application No. 62/445,458, filed on Jan. 12, 2017. The foregoing application is incorporated herein by reference in its entirety.

BACKGROUND

Technical Field

The present disclosure relates generally to determining a road surface characteristic. Additionally, this disclosure relates to systems and methods for providing information for causing a change to a vehicle control system in accordance with the road surface characteristic.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation.

One obstacle that may impede an autonomous vehicle's ability to navigate to a destination is difficulty in adjusting systems within the vehicle based on approaching road surface characteristics. Varying road characteristics require vehicle system adjustments for a safer and more comfortable operation of the autonomous vehicle. Therefore, a need exists for a system capable of detecting road surface characteristics and adjusting vehicle control systems accordingly. The present disclosure is directed to addressing these and other challenges.

SUMMARY

Embodiments consistent with the present disclosure provide systems and methods for determining a road surface characteristic. Disclosed embodiments further relate to systems and methods for providing information for causing a change to at least one control system of a vehicle in accordance with the road surface characteristic by analyzing images from at least one camera mounted on or included in the vehicle.

In some embodiments, cameras may provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In one embodiment, a system determines an adjustment for a vehicle control system. The system includes at least one processing device programmed to receive from at least one camera, at least two images representative of an environment of the vehicle, the environment including a road surface ahead of the vehicle, wherein at least one of the two images includes color information; align at least a portion of the at least two images using estimated motion of the vehicle; provide, to a trained system configured to determine a characteristic of the road surface, at least the aligned portions of the at least two images; receive, from the trained system, the determined characteristic of the road surface; and provide, to the vehicle control system, based on at least the determined characteristic of the road surface, control information for changing at least one setting of the vehicle control system.

In one embodiment, a vehicle includes a vehicle control system and at least one processing device. The at least one processing device is programmed to receive from at least one camera, at least two images representative of an environment of the vehicle, the environment including a road surface ahead of the vehicle, wherein at least one of the two images includes color information; align at least a portion of the at least two images using estimated motion of the vehicle; provide, to a trained system configured to determine a characteristic of the road surface, at least the aligned portions of the at least two images; receive, from the trained system, the determined characteristic of the road surface; and provide, to the vehicle control system, based on at least the determined characteristic of the road surface, control information for changing at least one setting of the vehicle control system.

In one embodiment, a method determines an adjustment to a suspension system of a vehicle. The method includes receiving from at least one camera, at least two images representative of an environment of the vehicle, the environment including a road surface ahead of the vehicle, wherein at least one of the two images includes color information; aligning at least a portion of the at least two images using estimated motion of the vehicle; providing, to a trained system configured to determine a characteristic of the road surface, at least the aligned portions of the at least two images; receiving, from the trained system, the determined characteristic of the road surface; and providing, to the vehicle control system, based on at least the determined characteristic of the road surface, control information for changing at least one setting of the vehicle control system.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2A is a diagrammatic side view representation of an exemplary vehicle including a system consistent with the disclosed embodiments.

DETAILED DESCRIPTION

Figure 1:
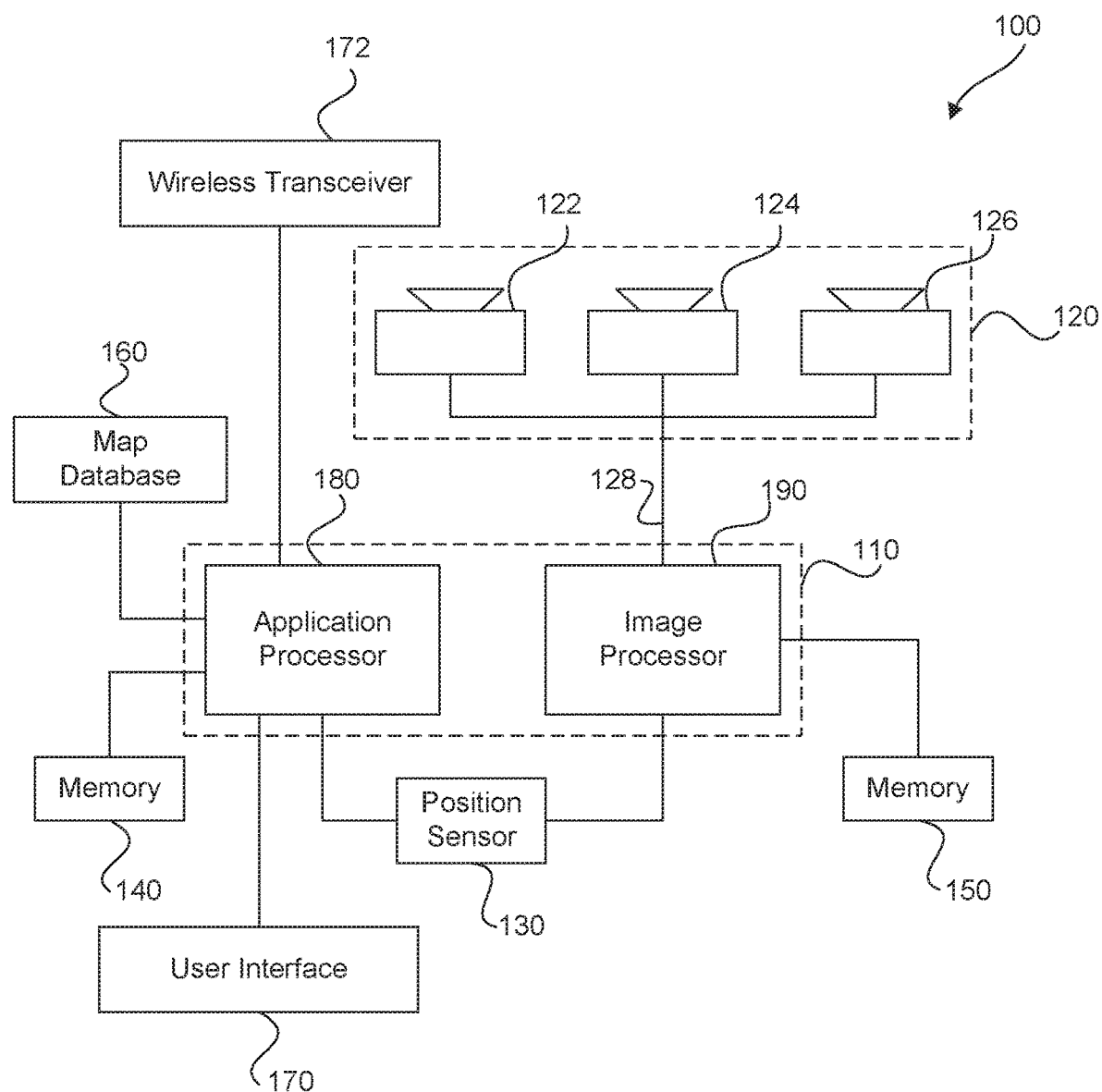
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 902.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32®34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM™, which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2B:
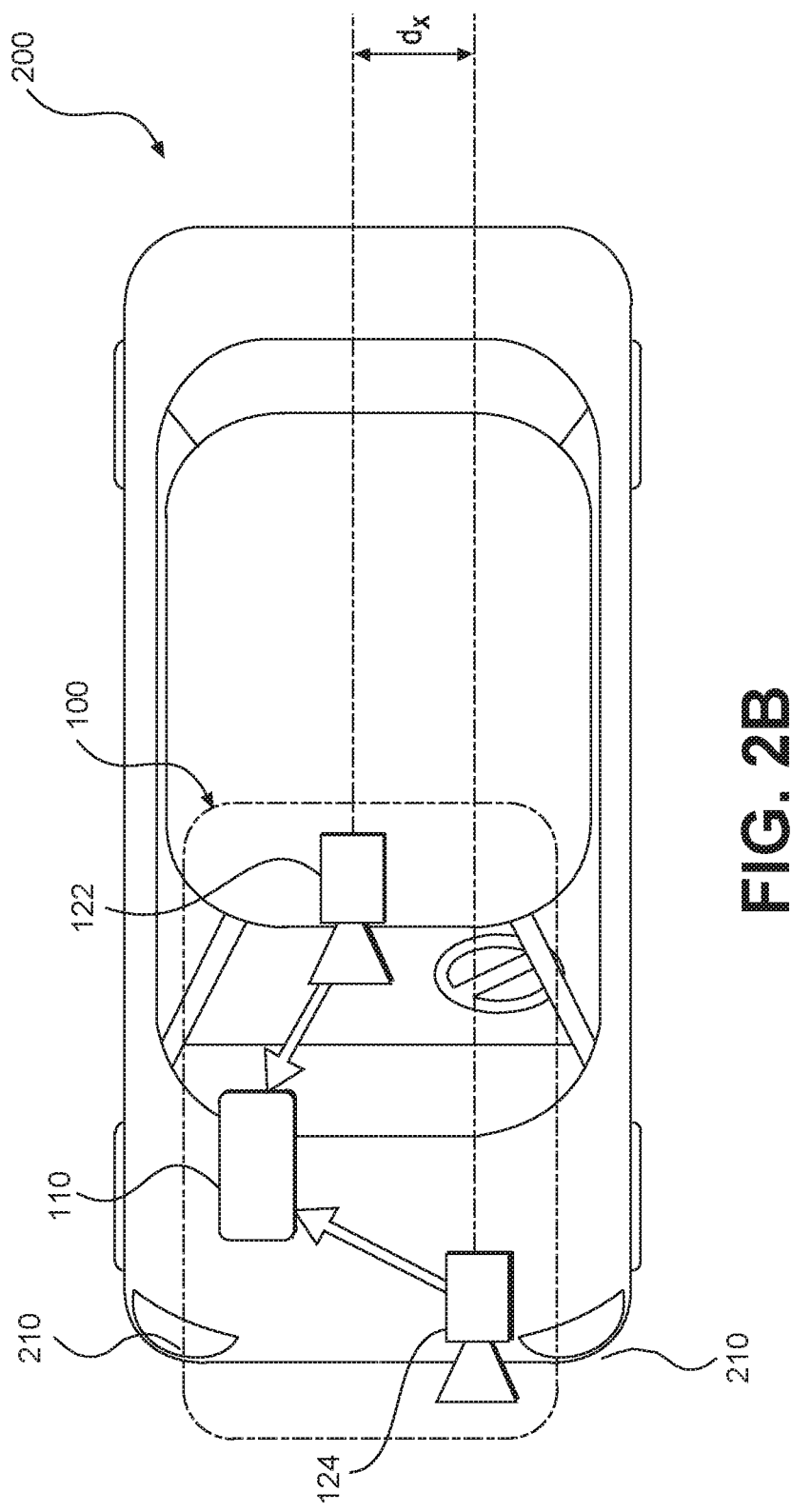
FIG. 2B is a diagrammatic top view representation of the vehicle and system shown in FIG. 2A consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
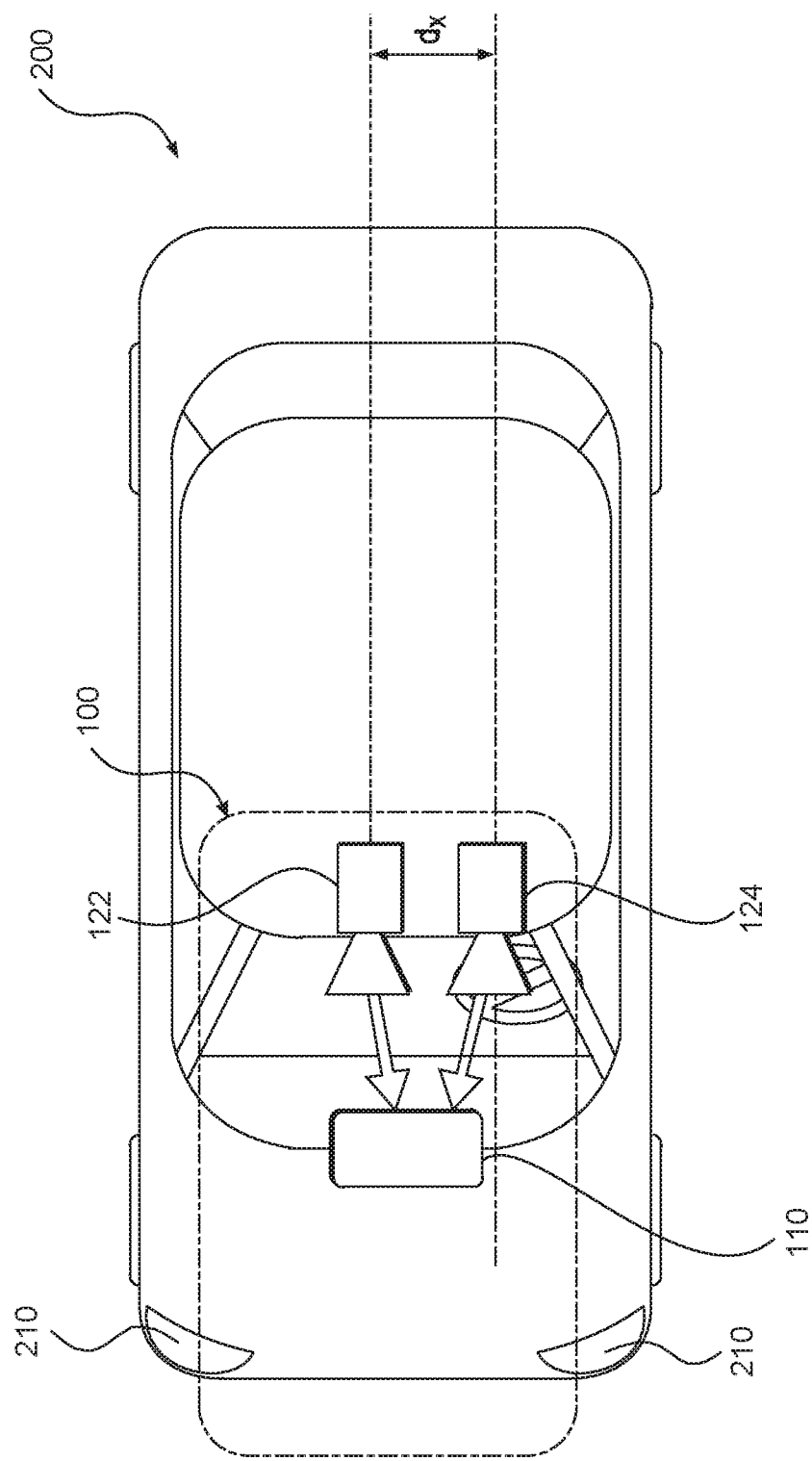
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
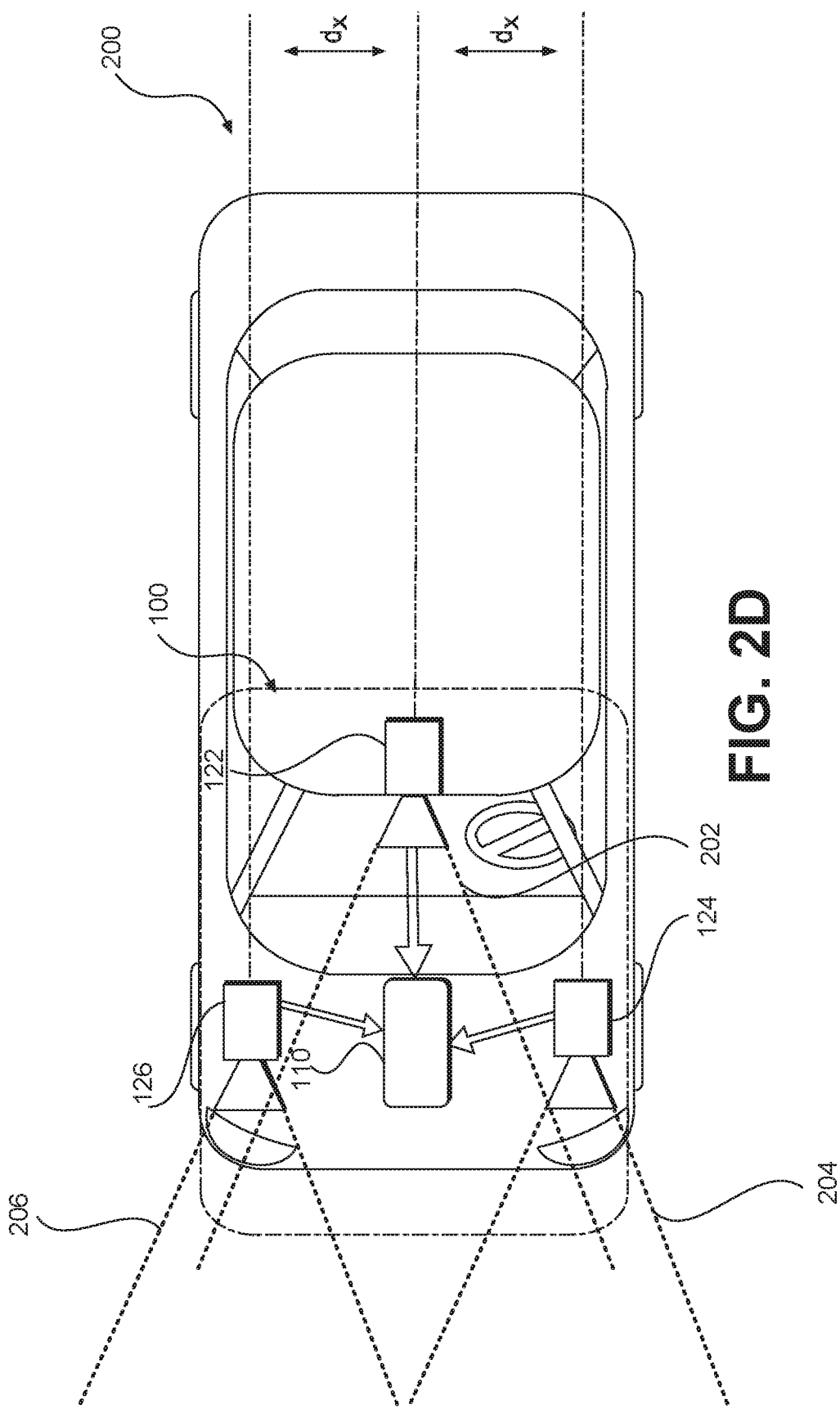
FIG. 2D is a diagrammatic top view representation of yet another embodiment of a vehicle including a system consistent with the disclosed embodiments.
Figure 2E:
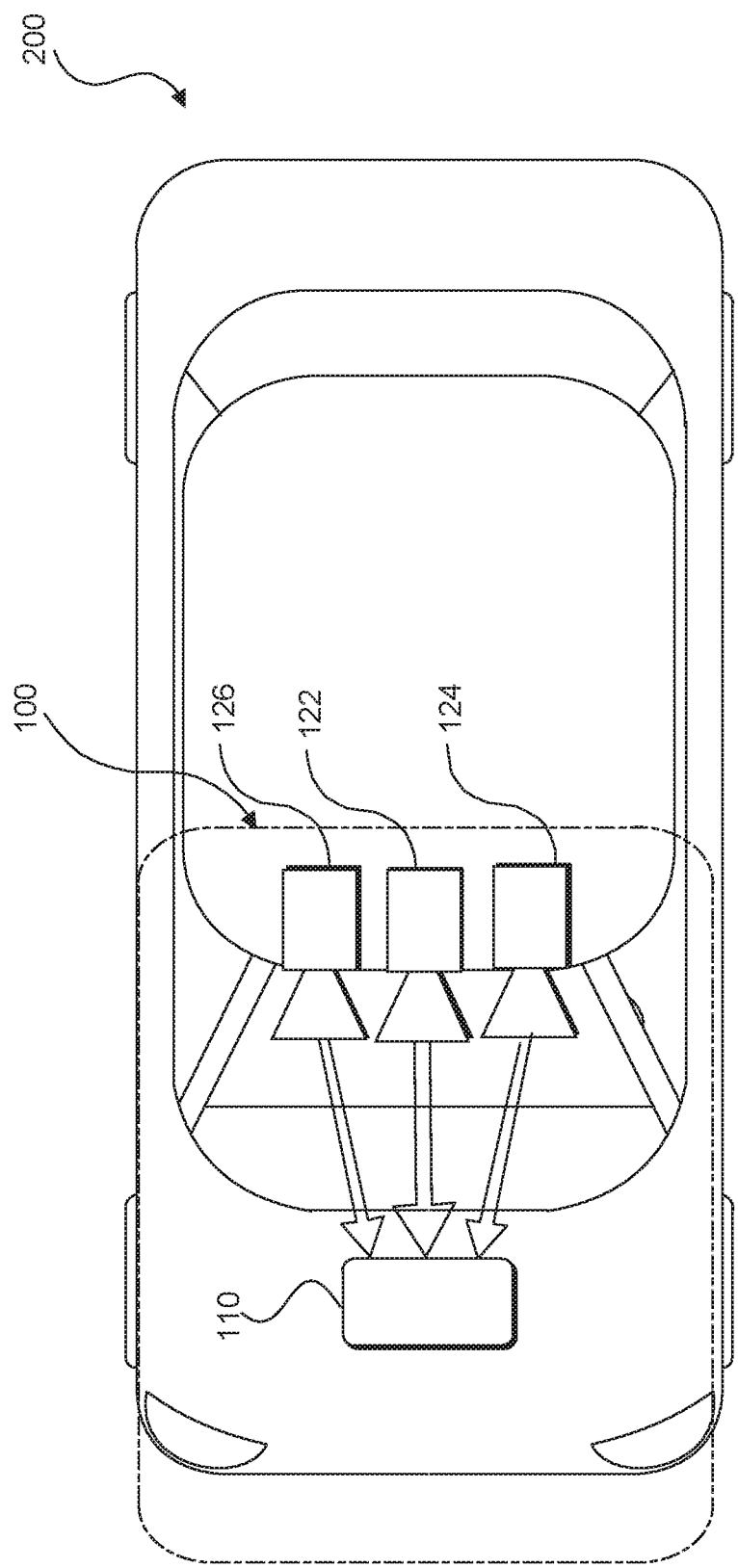
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2 M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5 M pixel, 7 M pixel, 10 M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
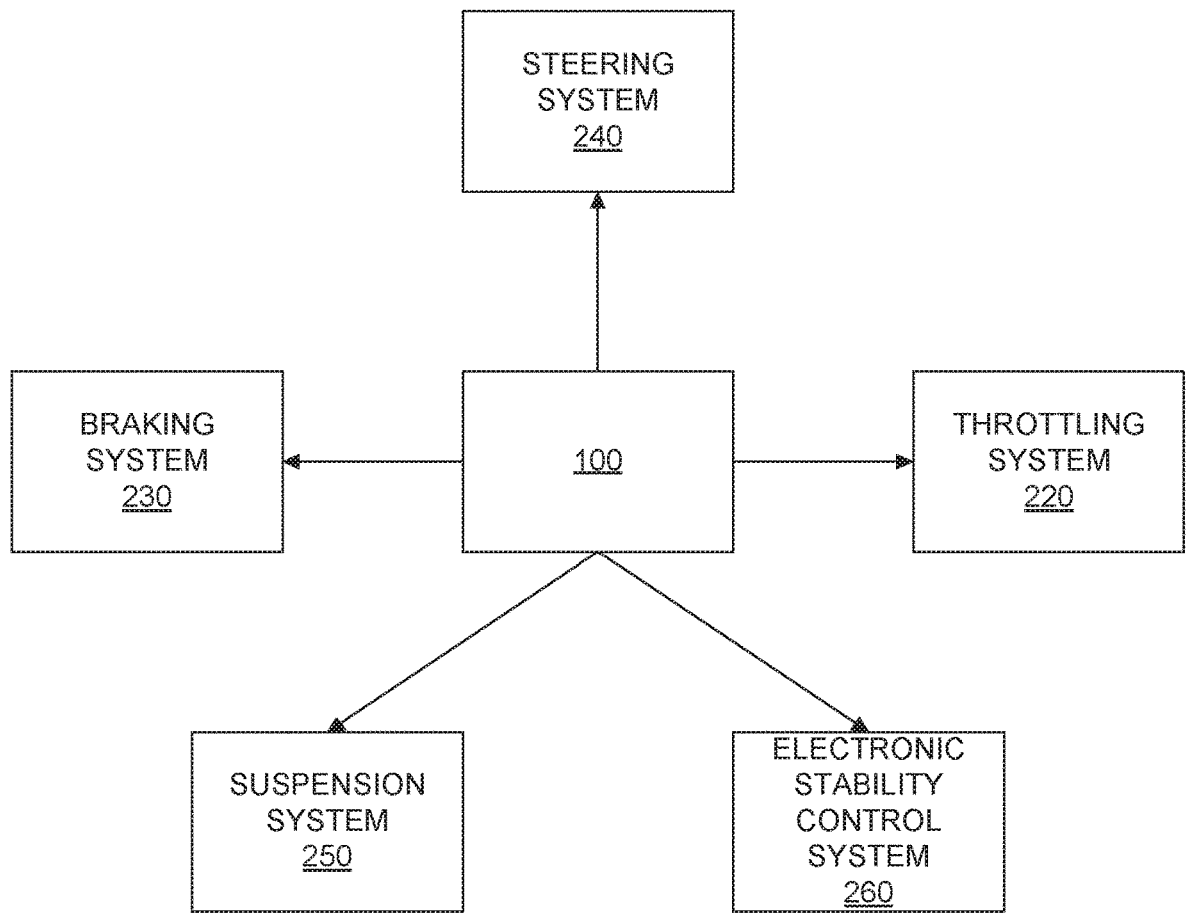
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, steering system 240, suspension system 250, and electronic stability control system 260. System 100 may provide inputs (e.g., control signals) to one or more of throttling system 220, braking system 230, steering system 240, suspension system 250, and electronic stability control system 260 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, steering system 240, suspension system 250, and electronic stability control system 260 to navigate vehicle 200 (e.g., by causing an acceleration, a turn, a lane shift, a change in suspension setting, etc.). Further, system 100 may receive inputs from one or more of throttling system 220, braking system 230, steering system 240, suspension system 250, and electronic stability control system 260 indicating operating conditions of vehicle 200 (e.g., speed, whether vehicle 200 is braking and/or turning, a suspension setting, etc.). Further details are provided in connection with FIGS. 4-7, below.

Figure 3A:
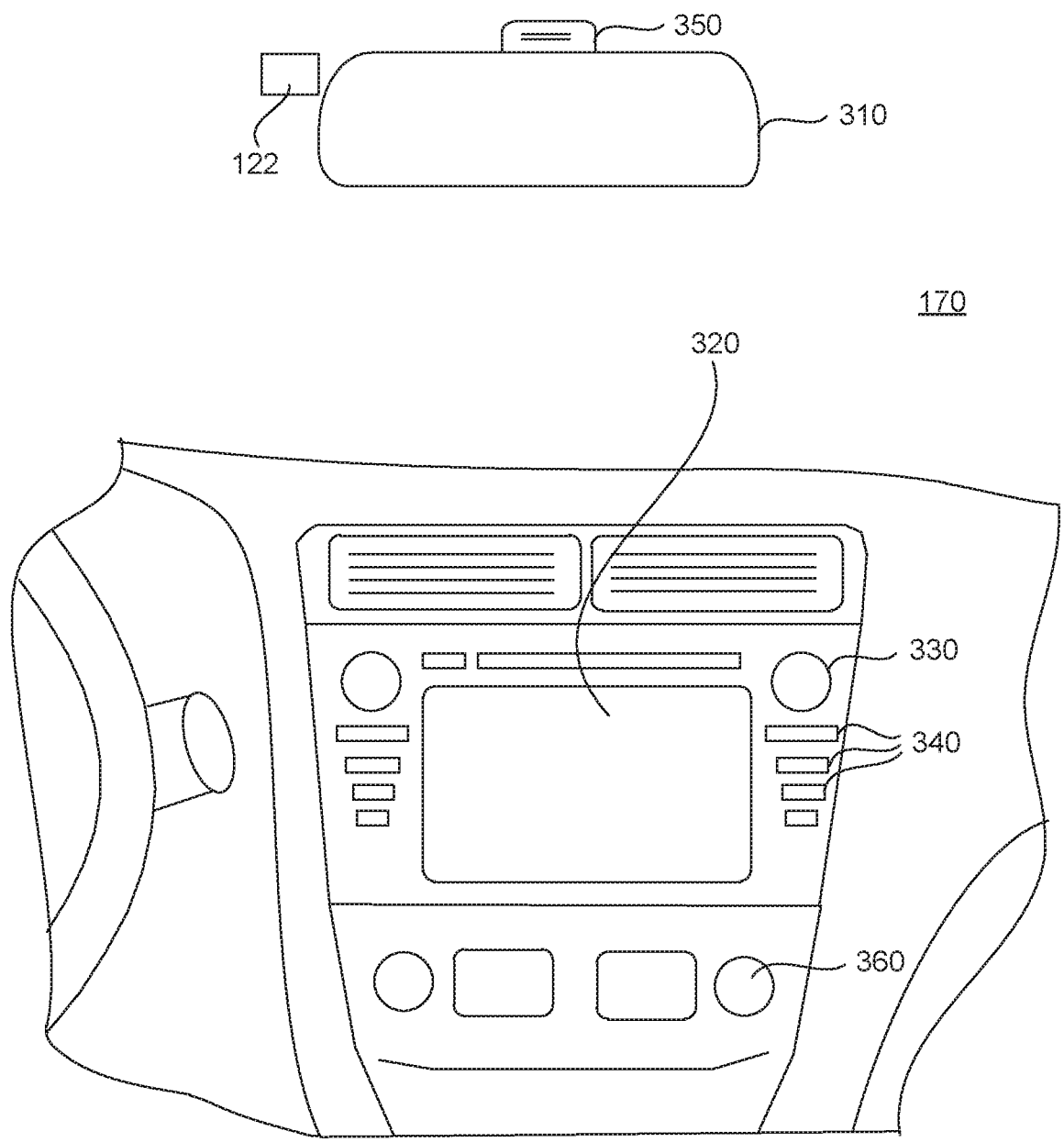
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
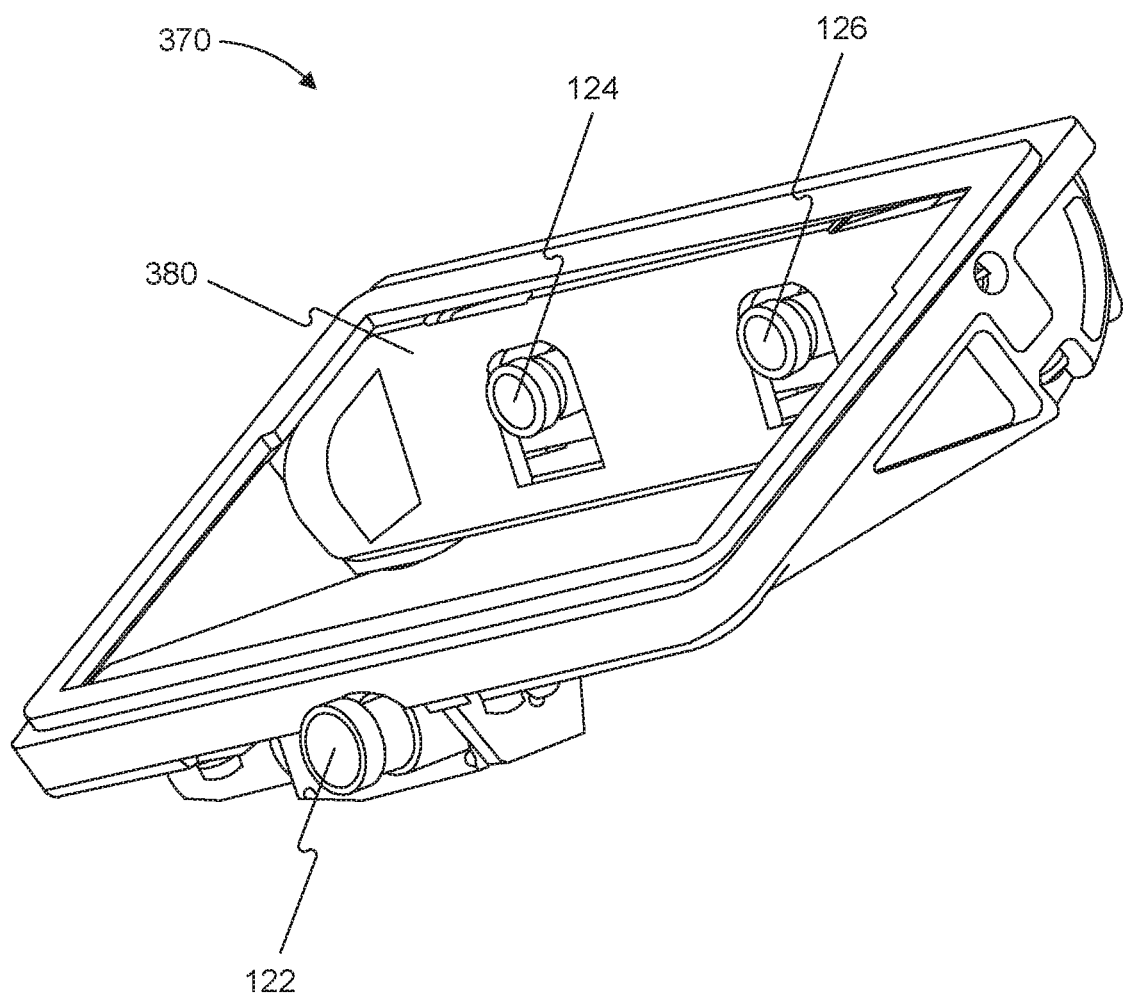
FIG. 3B is an illustration of an example of a camera mount that is configured to be positioned behind a rearview mirror and against a vehicle windshield consistent with the disclosed embodiments.
Figure 3C:
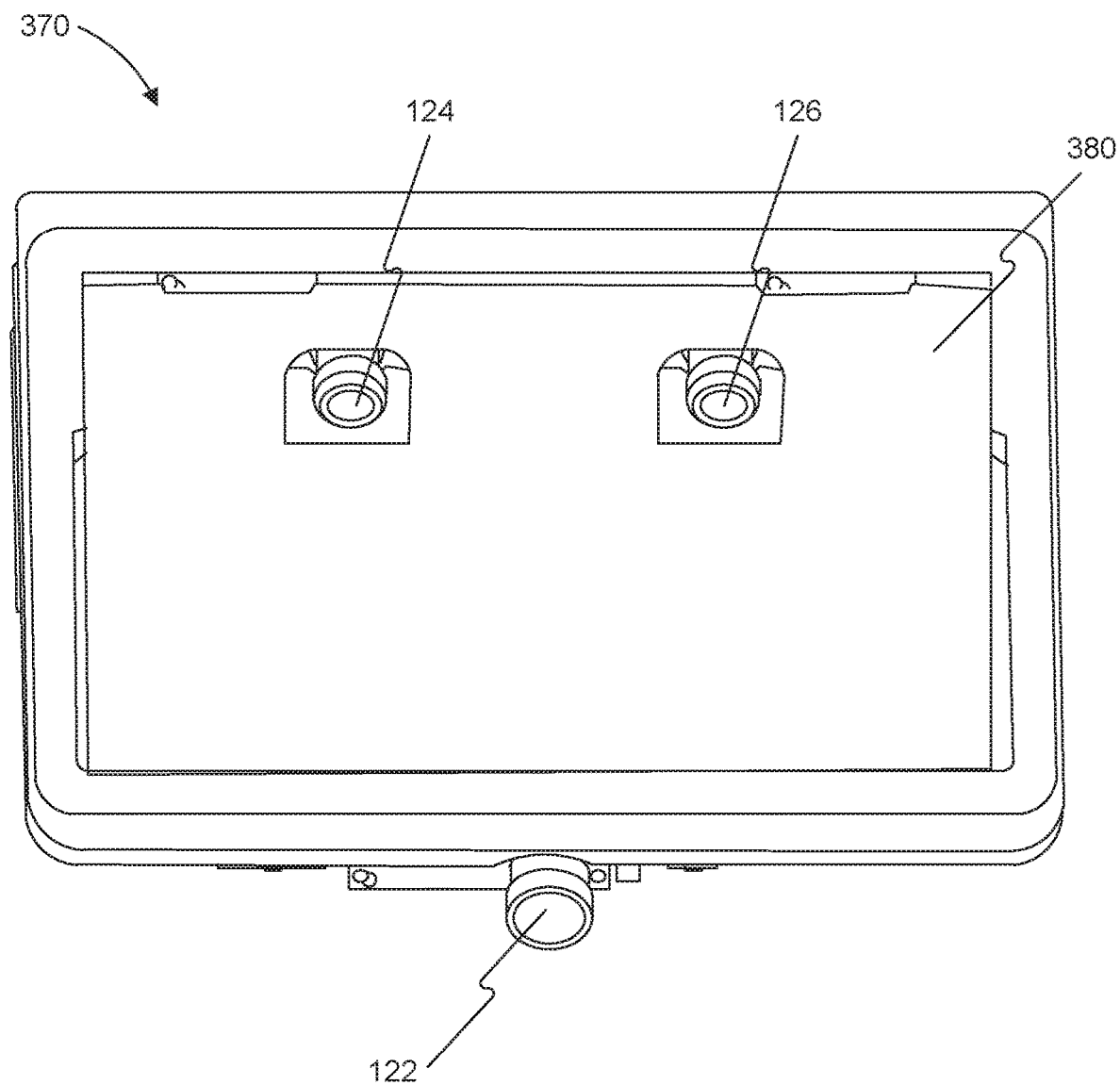
FIG. 3C is an illustration of the camera mount shown in FIG. 3B from a different perspective consistent with the disclosed embodiments.
Figure 3D:
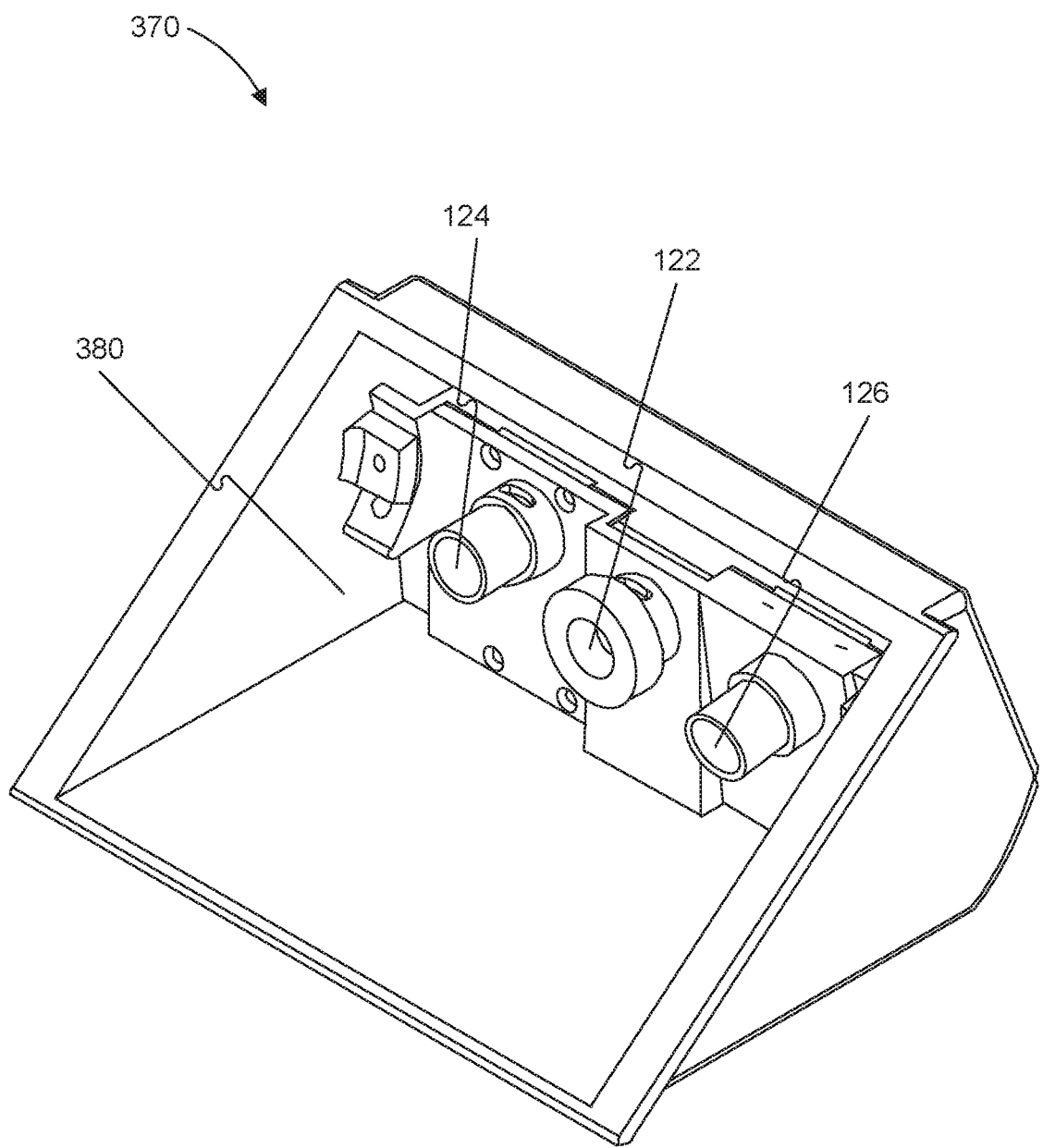
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, steering, and/or suspension setting of vehicle 200 (e.g., by sending control signals to one or more of throttling system 220, braking system 230, steering system 240, suspension system 250, and electronic stability control system 260). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
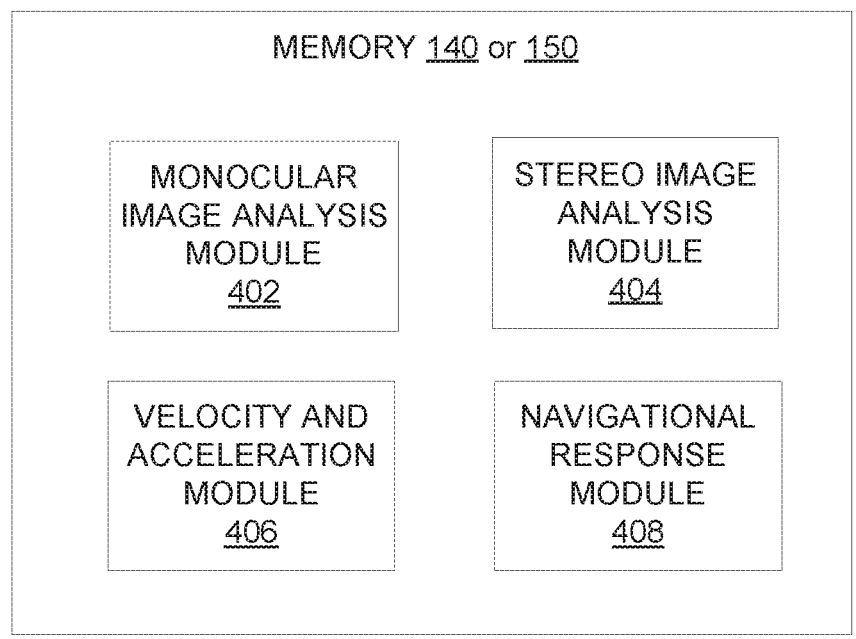
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, steering system 240, suspension system 250, and/or electronic stability control system 260 of vehicle 200. Based on the calculated target speed, processing unit 110 may transmit one or more electronic signals to throttling system 220, braking system 230, steering system 240, suspension system 250, and/or electronic stability control system 260 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, steering system 240, suspension system 250, and electronic stability control system 260 of vehicle 200. Based on the desired navigational response, processing unit 110 may transmit one or more electronic signals to throttling system 220, braking system 230, steering system 240, suspension system 250, and electronic stability control system 260 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
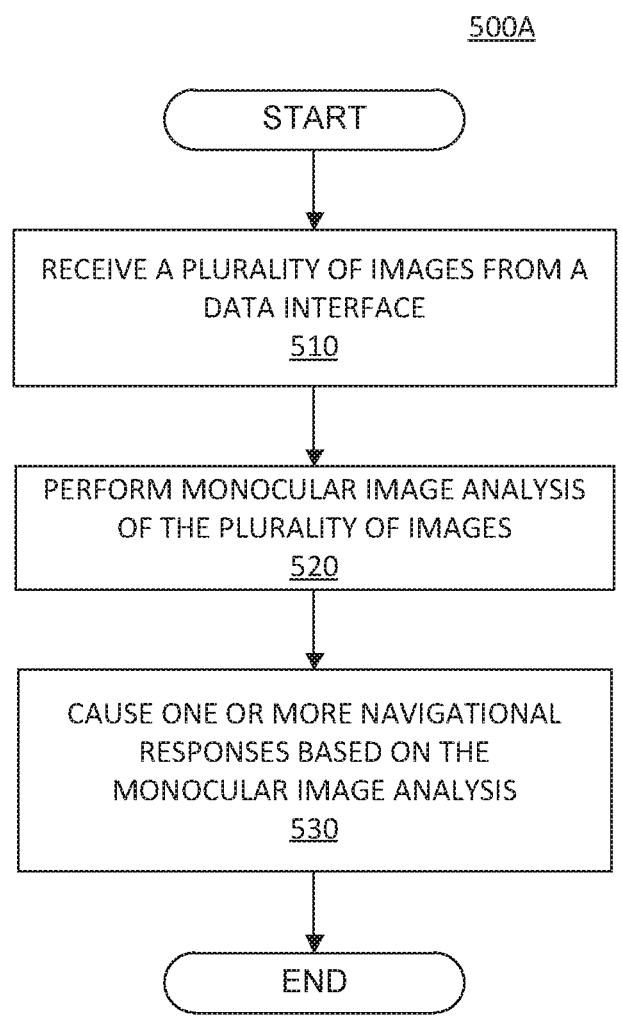
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, a change in suspension setting, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200. As another example, processing unit 110 may cause vehicle 200 to brake while at the same time shifting lanes, and then change the suspension setting by, for example, simultaneously transmitting control signals to braking system 230 and steering system 240 of vehicle 200, and the sequentially transmitting a control signal to suspension system 250 of vehicle 200.

Figure 5B:
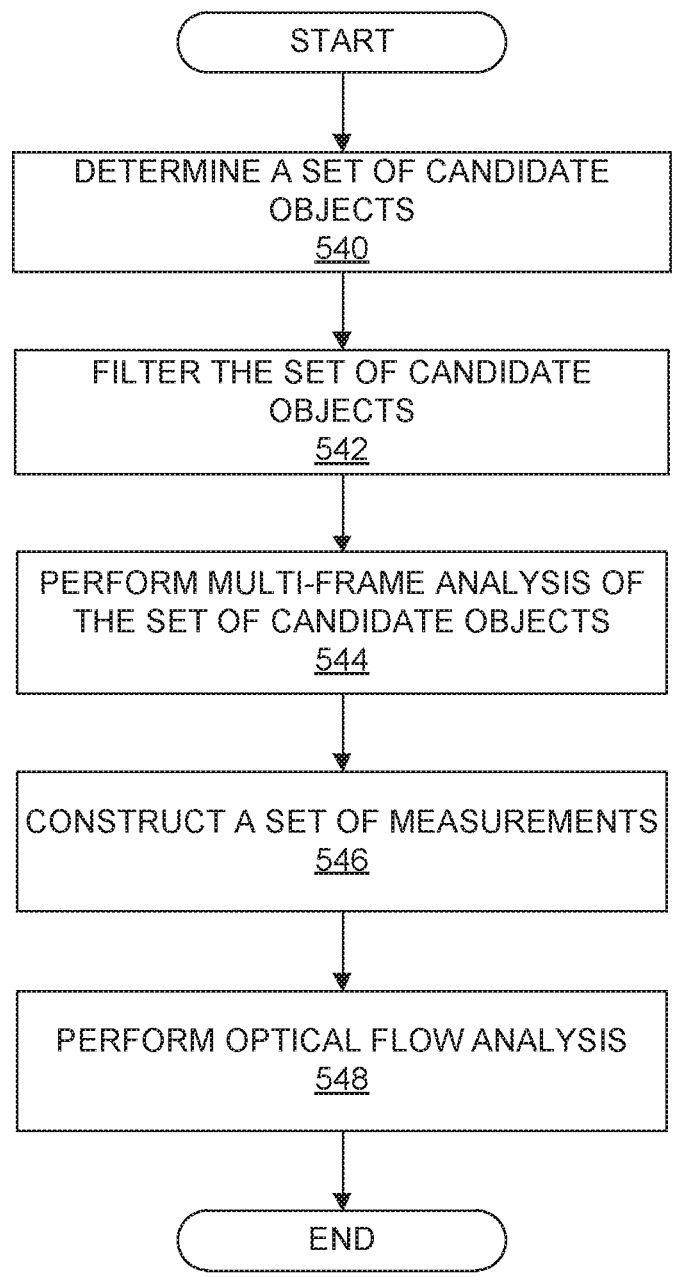
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
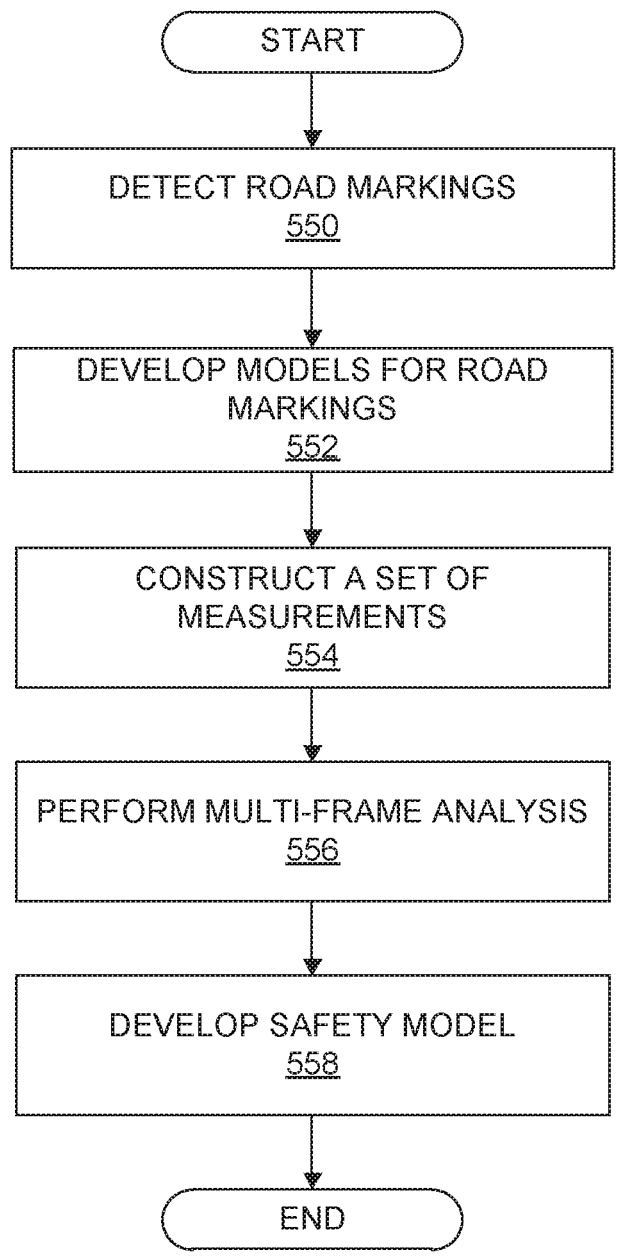
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
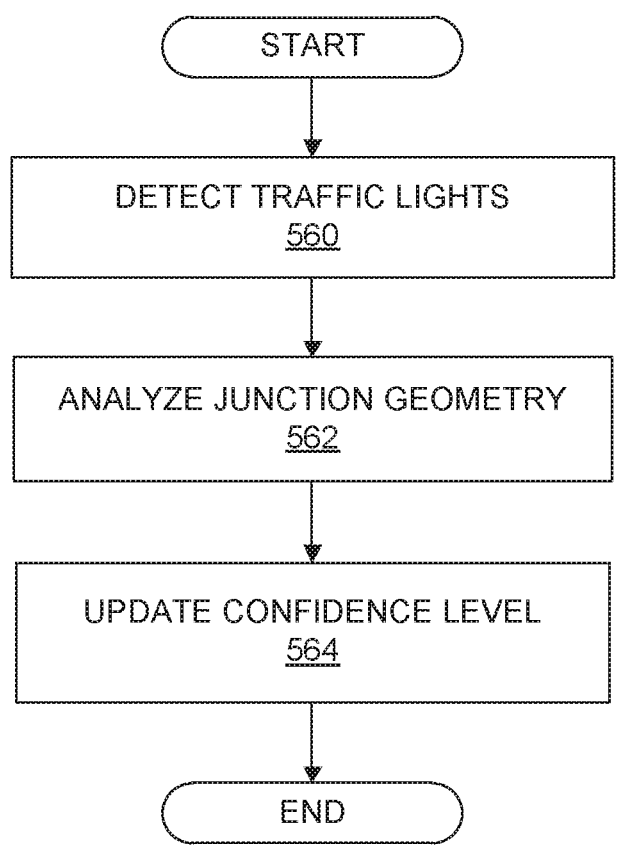
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
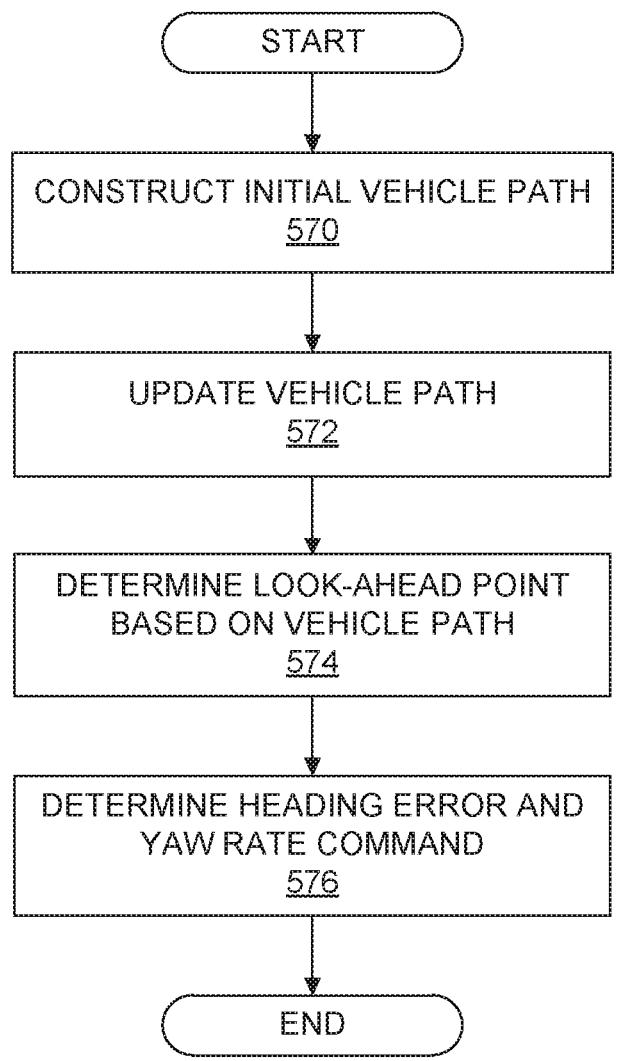
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
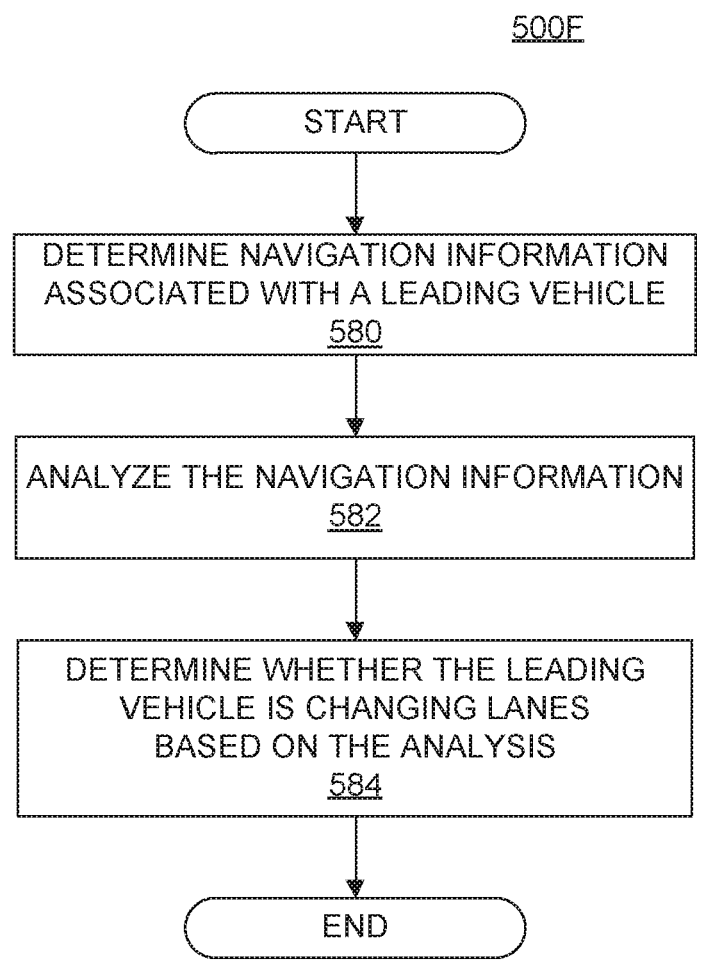
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
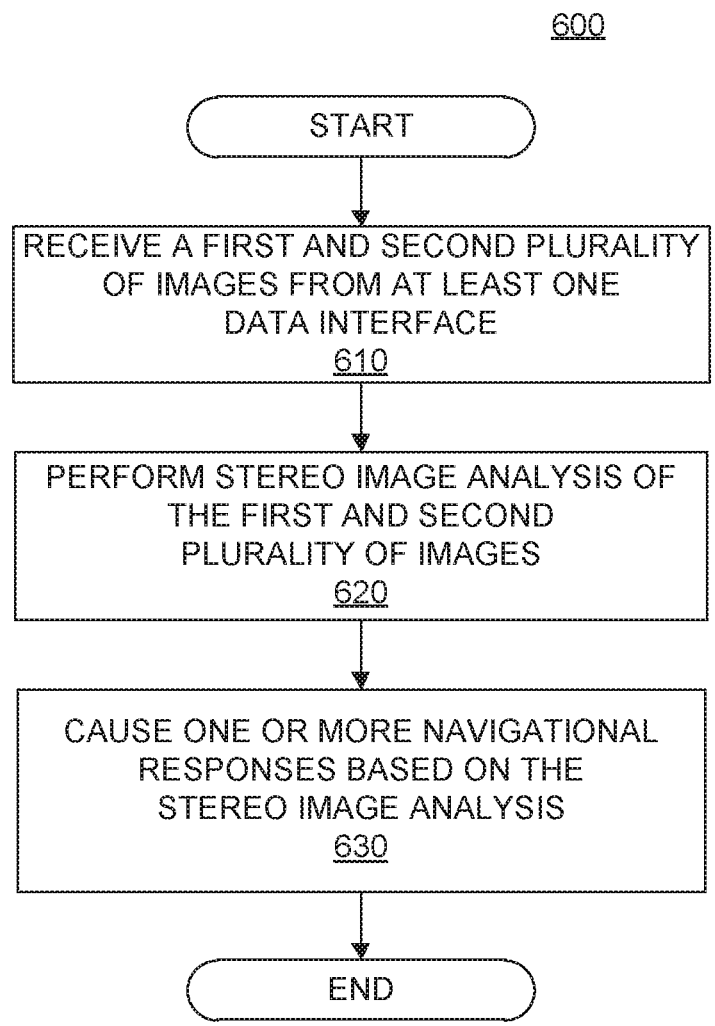
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
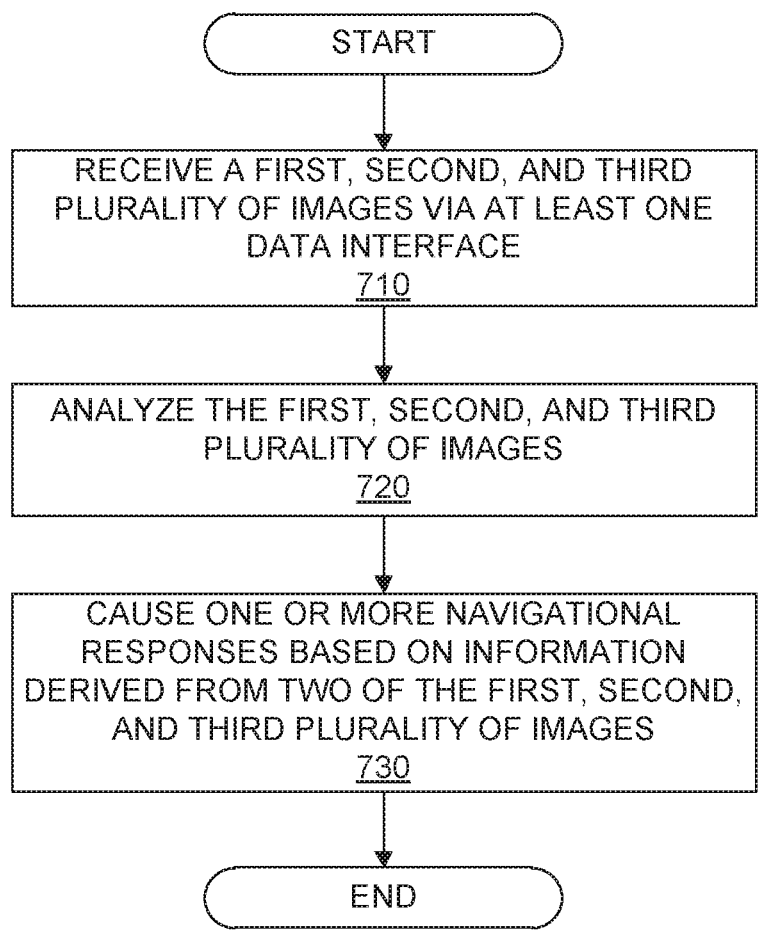
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Determining a Road Surface Characteristic

Vehicles equipped with an electronic stability control (ESC) system (also referred to as electronic stability program (ESP) or dynamic stability control (DSC)) may be capable of detecting and compensating for vehicle skidding. In doing so, such systems may monitor and detect the skidding of each wheel and indirectly determine a measure of the road surface friction. In particular, these systems may detect if the road under the wheel is slippery from ice or rain, as each will have a different measure of loss of traction.

Vehicles may also include active and semi dynamic suspension systems. These systems may detect unevenness in the road under the vehicle by monitoring the motion of the vehicle suspension. These systems may thus detect whether the road under the wheels is, for example, rough, smooth, or gravel. These systems may also detect sudden steps in the road, which might be due to repaving of part of the road or steel plates placed on the road to cover holes, and the like. This information may then be used, in a fraction of a second, to adjust the suspension setting for improved ride comfort.

Both ESC and semi-active suspension systems may benefit from the ability to predict that a vehicle is approaching a slick area of the road, a rough area, or a road surface elevation change (e.g., a step, change, or discontinuity in the elevation of the road's surface). For example, ice on a road may be a significant indication for a traction control system, and may be less significant for a suspension system. A bump in a critical point of a curve may bounce a wheel and affect the tracking of the wheels affected by the bump. Accordingly, the disclosed embodiments may use the results of analysis of one or more images to determine surface characteristics of the road and may adjust one or more settings of a vehicle control system to compensate for the road surface characteristic.

As discussed below in further detail, the disclosed embodiments may determine an adjustment for a vehicle control system based on, for example, a surface characteristic of a road surface on which the vehicle will travel. For example, a system consistent with a disclosed embodiment may include at least one processing device programmed to receive, from at least one camera, at least two images representative of an environment of a vehicle, including a road surface ahead of the vehicle. The at least one processing device may be further programmed to determine a characteristic of the road surface using the at least two images. In some embodiments, the characteristic of the road surface may be determined using a trained system, as discussed below in further detail. The at least one processing device may be further programmed to provide, to the vehicle control system, based on at least the determined characteristic of the road surface, control information for changing at least one setting of the vehicle control system.

In some embodiments, systems and methods disclosed herein may analyze one or more high resolution images to determine roughness of a road surface characteristic. Further, the disclosed systems and methods may analyze multiple images to determine subtle road profile shapes such as steps as small as, for example, 1 cm high (typically using structure from motion (SFM)) using multiple images from a single camera or a plurality of cameras (e.g., stereo camera pairs)).

As further examples, wet roads may have specular highlights while puddles and ice may reflect like mirrors with reflected objects appearing under the road surface in motion sequences or images captured from one or more cameras. The disclosed systems and methods may further analyze color information to detect a surface characteristic. For example, a wet surface may reflect the sky and the images may typically include more blue colors.

The disclosed systems and methods may analyze images to determine a road surface characteristic. One parameter that the system may analyze to determine the road surface characteristic is reflectiveness. For example, a puddle, or ice, may be a reflective surface. As one example, a camera mounted at a height of 1.25 meter and aimed at the puddle or icy road surface, for example, 7 meters ahead of vehicle may reflect about 50% of the light from the sky and other objects in the scene. The reflection may thus appear brighter in daytime and darker at night, as compared to its surroundings, and the reflected object may appear clearly on the road surface. The 7 meter mark is given by way of example, and other distances may be used (e.g., 1 meter, 2 meters, 3 meters, 4 meters, 5 meters, 6 meters, 8 meters, etc.). Multiple distances may be used and the system may detect the road surface quality at multiple points in front of the wheels. An analysis of the multiple images may also result in detecting that texture has disappeared, which may be a result of the presence of the puddle or ice. The multiple images may also be used to detect three-dimensional structures.

As another example, a wet road with no puddles may produce specular reflections from the water covering the road surface to create a different texture than dry road. Direct sunlight and vehicle headlights may cause small bright spots of the different texture. Since the road texture at a fine scale may be curved, the specular spots may move on the road surface as the vehicle travels. The motion is different at day and night since at night, as the light source is also moving. Thus, in a high resolution image, the bright specular points may move relative to a stabilized road surface image. Thus, color images to detect sky colors in the road surface, texture, and three-dimensional shape may be used to determine a road surface characteristic.

The disclosed system and methods may also analyze images combined with analysis of the residual motion of a stabilized road plane to detect positive step edges. A typical algorithm may detect horizontal edges in the image in the path of the vehicle and may fit the residual motion to two planes, on either side of the edge. The system may use this to estimate a height difference. The system may detect negative step edges during the day in the same way. At night, the system may also detect a dark shadow produced by the vehicle's own headlights.

The disclosed systems and methods may also determine road texture and roughness based on an analysis of texture in the image. Due to perspective, the texture may appear finer higher as the vehicle approaches the road surface portrayed by the image. The image may also appear to have anisotropic features that may be foreshortened in the vertical direction. The system may use color to differentiate gravel from rough asphalt. Light sources including headlights may cause small shadows on the road texture. As the vehicle approaches the road surface with these features, these shadows will shrink in size on the road and will thus not increase as much as would otherwise be expected. Thus, motion information may also be useful, particularly at night.

The systems and methods disclosed herein may use learning techniques to measure road surface characteristics and use the data to predict a vehicle response. In some embodiments, these techniques may generate and automatically label large volumes of test data. For example, electronic stability control and suspensions systems may internally determine values for a road surface characteristic. These may be a quantitative value such as a numerical measure of roughness or a value associated with wheel suspension, vertical travel, and acceleration which may correlate to a measure of step size. For example, by detecting a point on an image within the wheel path, for example, 7 meters ahead of the vehicle, the system may be configured to associate the image with data from the electronic stability control and suspension system response after the vehicle has moved 7 meters forward. This may result in data which may be stored including an image and measured response by the vehicle control systems, which can be used in various learning techniques such as a deep neural network (DNN).

Input to the learning system may include multiple images with high resolution where the distance between the camera locations is substantially constant (either using a stereo or using a motion sequence) and selecting images where the vehicle has moved a given distance (e.g., 0.7 meters). The system may further stabilize these images to a ground plane and the images may include color information. In some embodiments, the color information may be in a primary image and a secondary set of warped images may be monochrome.

In some embodiments, the disclosed systems and methods may use motion of the vehicle relative to the road plane by tracking points between two images and using one or more algorithms (e.g., a random sample consensus (RANSAC) algorithm) to determine a homography of images due to a dominant plane. The homography may be decomposed into rotation, translation and the plane normal. From this, the disclosed systems and methods may determine, for example, a line on the road a given distance in front of a vehicle (e.g., vehicle 200, discussed above). For example a line on the road 7 meters in front of the wheels, may be used with a determined steering angle, or alternatively a yaw rate, to predict the path of the vehicle wheels in the image.

In some embodiments, the disclosed systems and methods may use image portions or image strips depicting a road at a specified distance in front of the wheels of the vehicle (e.g., vehicle 200) as input to a trained system. Using inputs to the trained system, the disclosed systems and methods may output a predicted road surface characteristic for the specified distance in front of the wheels of the vehicle. For example, two strips or image portions from a primary image may correspond to the left and right wheel tracks together. Tracks from a previous image warped according to the computed homography between the two images may also be used. The previous image may be selected from all previous images so that vehicle has moved a set distance (or as close as possible to that set distance).

In some embodiments, the disclosed systems and methods may use only one monochrome image. A strip from a current color image may be used. An RCC imager may be used to interpolate the monochrome image from the clear pixels of the current image. A half size image may be created by sampling only the red pixels from each strip (the red image producing a scaled version of the strip). The red pixels may then be inserted back into the monochrome strip to recreate a red clear image. The strip from the previous image may be purely monochrome. It may thereby be sufficient to include color information in only one of the two images.

In some embodiments, four strips may be fed as input to the DNN and the output may be a measure of the predicted road surface characteristic in front of the wheel of vehicle 200. Each measure (roughness, step, traction) may have its own DNN but typically may share many layers of the DNN and thus save computational resources. The predicted values may be fed into the relevant controllers for electronic stability control or active suspension. For example, processing unit 110 may transmit predicted values determined by the trained system to the relevant controllers for an ESC or active suspension system.

As indicated above, reference to the distance 7 meters in front of vehicle 200 is provided as merely an example. A position of the road may be any given distance in front of vehicle 200, and may also be provided in terms of a time to reach that position rather than a distance. Further, the use of strips as input to the DNN is only one of many options. Further, in some embodiments, the whole area of the road in front of the vehicle may be used and in fact the whole image may be used based on computational efficiency. The part of the road that is used may be determined dynamically, for example, based on the road conditions. In yet further embodiments, at an initial stage, a general assessment may be carried out to determine whether the surface of the road ahead of the vehicle is even or homogeneous in terms of its characteristics (e.g., level of smoothness, traction, etc.) or if it is patchy. In one embodiment, an initial estimation may be performed whereby various parts of the surface of the road ahead may be identified as being suspected to have characteristics that are different from those of other part of the surface of the road ahead of the vehicle. Based on this initial estimation, the road surface characteristic determination process may be extended to include additional or greater portions of the road ahead of the vehicle.

The disclosed systems and methods may also include controllers that may compute road surface characteristics based on sensors in the wheels, suspension etc. The system may determine a constant difference between predicted value and one sensed by the vehicle and may indicate an error flag to the system. The error flag may be indicative of an image sensor malfunction.

In some embodiments, the disclosed systems and methods may collect training data. For example, after vehicle 200 has traveled over or past a road surface characteristic, processing unit 110 may record in a memory (e.g., included in system 100 and/or located remotely and available over a network, such as a server) measurements for one or more parameters (e.g., type, size, height, color, reflectiveness, etc.) related to the road surface characteristic. System 100 may compare such recorded measured parameters to a predicted road surface characteristic to improve the predictability and/or reliability of system 100 and/or suspension system 250.

According to some embodiments, during the training data collection phase, the disclosed systems and method may be configured to quantify the collected sensor data. In further example, the quantification process may be normalized across a plurality of vehicles, so that the data collected from any given vehicle may be applied to other vehicles having different characteristics. For example, a force that is applied to a suspension system of a vehicle, which can be used, in combination with images of the relevant part of the road surface to determine a roughness level of a road surface, may be used in combination with certain characteristics of the vehicle to provide a measure (say a value) that indicates a "global" roughness level. Thus, the roughness level may be combined with measurements from other vehicles and other roads. In some examples, further information may also be used in the training phase, such as for example, ambient conditions, such ambient or environmental conditions, such a lighting or surface temperature, etc.

In the disclosed systems and methods, certain measures, such as step edges, may require precise localization. Thus, a tag associating an image with a particular road surface characteristic based on the image sampling may not be sufficiently dense to predict the event. For example, in the case of a step in the road 7 meters from a vehicle, the image may be tagged as having a step and the location of that step in front of the wheel. A vehicle traveling at a maximum distance of 1 meter between frames may include strips extending 1 meter around the 7 meter mark and the image may be tagged if there is a step within the rage of 0:5 meter around the 7 meter mark and at what location. Thus, there may be two related tags for each image: an existence of a step (including a sign and a height) and a position of the step relative to the 7 meter mark.

In the disclosed systems and methods, transitions between road surface characteristics may be tagged in a manner described above. An alternative manner of tagging may include mapping measures from the controller (which may be determined at a high sampling rate) back to the image or strip such that the road quality profile is associated with the strip. The DNN may then be trained to a mapping from input data to a vector of results.

In one embodiment, a system (e.g., system 100) for a vehicle (e.g., 200) may determine an adjustment for a vehicle control system such as, for example, a suspension system of the vehicle (e.g., suspension system 250), or an electronic stability control system (e.g., electronic stability control system 260). The adjustment may be based on a road surface characteristic. Any substance on a road, any feature of a road's surface, or any elevation change of a road may constitute a "characteristic of a road surface" or a "road surface characteristic," as discussed herein. In one embodiment, only certain substances on a road and features of a road surface that have certain characteristic (e.g., a minimum dimension) may constitute a "characteristic of a road surface." For example, substances that cannot be reliably detected using the camera and/or the trained system, at the desired distance, may not be considered a "characteristic of a road surface." In some embodiments, any substance that can be reliably detected (e.g., at an error rate that is less than a predetermined level, e.g., less than 1%, less than 5%, less than 10%, etc.) using the camera and the trained system, at the desired distance, may be considered a "characteristic of a road surface."

The system may include at least one processing device (e.g., processing unit 110) programmed to receive, from at least one camera (e.g., at least one of image capture devices 122, 124, and 126), at least two images representative of an environment of the vehicle. The environment may include a road surface ahead of the vehicle.

In some embodiments, at least one of the two images may include color information. In other embodiments, more than one image may include color information. Further, in some embodiments, the at least two images may be high resolution images. For example, the at least two images may have a resolution of at least one pixel per centimeter of the road surface at a distance of at least five meters ahead of the vehicle. As another example, the at least two images may have a resolution of at least one pixel per centimeter of the road surface at a distance of at least seven meters ahead of the vehicle.

In some embodiments, the at least one processing device may extract a portion of one or more of the images captured by the at least one camera and received by the at least one processing device. At least one of the image portions may include at least one region of a road surface on which at least one tire of the vehicle is predicted to travel. For example, one or more of the image portions may correspond to expected locations of the vehicle along the road which are spaced apart by a predefined distance (e.g., 0.5 meters to 2 meters).

In some embodiments, the images may include consecutive image frames or the image portions may be extracted from consecutive image frames. In other embodiments, the images may include image frames that are spaced apart from one another by at least a predefined amount (e.g., 2 image frames apart, 3 image frames apart, 5 image frames apart, 10 image frames apart, etc.). Any spacing of image frames, any number of images or image portions, and any combination of color and black and white images may be used consistent with the disclosed embodiments.

The at least one processing device may be further programmed to align at least a portion of the at least two images using estimated motion of the vehicle. For example, the at least one processing device may receive from at least one vehicle sensor (e.g., a camera, speed sensor, GSP receiver, lidar, radar, etc.) information to estimate the motion of the vehicle.

In some embodiments, the at least one processing device may perform an optical flow analysis of one or more images captured by the at least one camera to analyze motion patterns relative to vehicle 200. The at least one processing device may calculate the motion of candidate objects by observing different positions of objects across multiple image frames, which were captured at different times. Further, the at least one processing device may use the position and time values as inputs into mathematical models for calculating the motion of the objects and thus the estimated motion of vehicle 200 relative to the objects. The at least one processing device may use the estimated motion of the vehicle to determine that the vehicle has traveled a particular distance (e.g., 1 meter, 2 meters, 5 meters, etc.) between the capture of two images and may align the two images (or two image portions) accordingly.

The at least one processing device may be further programmed to provide, to a trained system, at least the aligned portions of the at least two images. In some embodiments, the vehicle may include the trained system. In other embodiments, the trained system may be located external to the vehicle and accessible via a network (e.g., the trained system may be included in a remote server accessible over a network, such as a cellular network and/or the Internet, etc.).

The trained system may include a learning system, such as a neural network. In some embodiments, the trained system may receive information from a learning system external to the vehicle (e.g., from a remote server including a learning system, such as a neural network). For example, the trained system may include software instructions and be configured to determine a characteristic of a road surface by analyzing one or more received images (or image portions). As discussed earlier, the images (or image portions) may have been aligned prior to being provided to the trained system. In other embodiments, the trained system may align the images prior to analysis. Analysis of the aligned images (or image portions) by the trained system may involve comparing pixel values of the aligned images (or image portions) to pixel values of one or more images previously classified as including certain road surface characteristics. The road surface characteristics associated with the images may be represented by any information, label, or identifier. Other image analysis techniques may also be used, such as edge detection.

The road surface may include various substances or be of different types of surfaces (e.g., smooth, rough, uneven, asphalt, pavement, etc.) For example, the road surface may include gravel, dust, dirt, cobblestones, bricks, or a smooth surface. In some embodiments, a characteristic of the road surface may include a roughness or a roughness level of a road surface. The roughness or roughness level of a road surface may represent a presence of gravel, dust, dirt, cobblestones, bricks, or the absence of rough features, e.g., a smooth surface. In some embodiments, a characteristic of the road surface may include a presence of a substance on a road surface, such as water, ice, or snow. Such information may further include magnitude information (e.g., how much water, ice, or snow). In some embodiments, a characteristic of the road surface may include a presence of a particular texture of a road surface.

In some embodiments, a characteristic of a road surface may include one or more of a surface type, a roughness level, and a traction level. For example, a roughness level may include one of a predefined set of levels (e.g., smooth, rough, uneven, etc.) or may be expressed by a magnitude on a particular scale. A traction level, for example, may include one of a predefined set of levels (e.g., patchy, slippery, grippy) or may be expressed by a magnitude on a particular scale. In some embodiments, a surface type indication alone or in combination with further information may indicate a roughness level and/or a traction level. Still further, a surface type may be complex, for example, a smooth wet road, or a gravel road partially covered by snow, etc.

The at least one processing device may be further programmed to receive, from the trained system, the determined characteristic of the road surface. Using at least the determined characteristic of the road surface, the at least one processing device may determine control information for changing at least one setting of a vehicle control system, such as suspension system 250 or electronic stability control system 260. The at least one processing device may determine the at least one setting change based on, for example, the roughness or roughness level of the road surface, the presence and/or magnitude of a substance on the road surface such as water, ice, or snow, and/or a texture of a the road surface. For example, to reduce loss of traction, the control information may cause electronic stability control system 260 to cause braking system 230 to apply braking to one or more wheels of the vehicle and/or to reduce engine power (e.g., via throttling system 220) to avoid skidding. As another example, to improve passenger comfort, the control information may cause suspension system 250 to adjust one or more of a spring rate, a wheel rate, and/or a roll rate of suspension system 250. Further, in some embodiments, the at least one processing device may determine control information for changing settings of multiple vehicle control systems (e.g., changing at least one setting of suspension system 250 and at least one setting of electronic stability control system 260).

Figure 8:
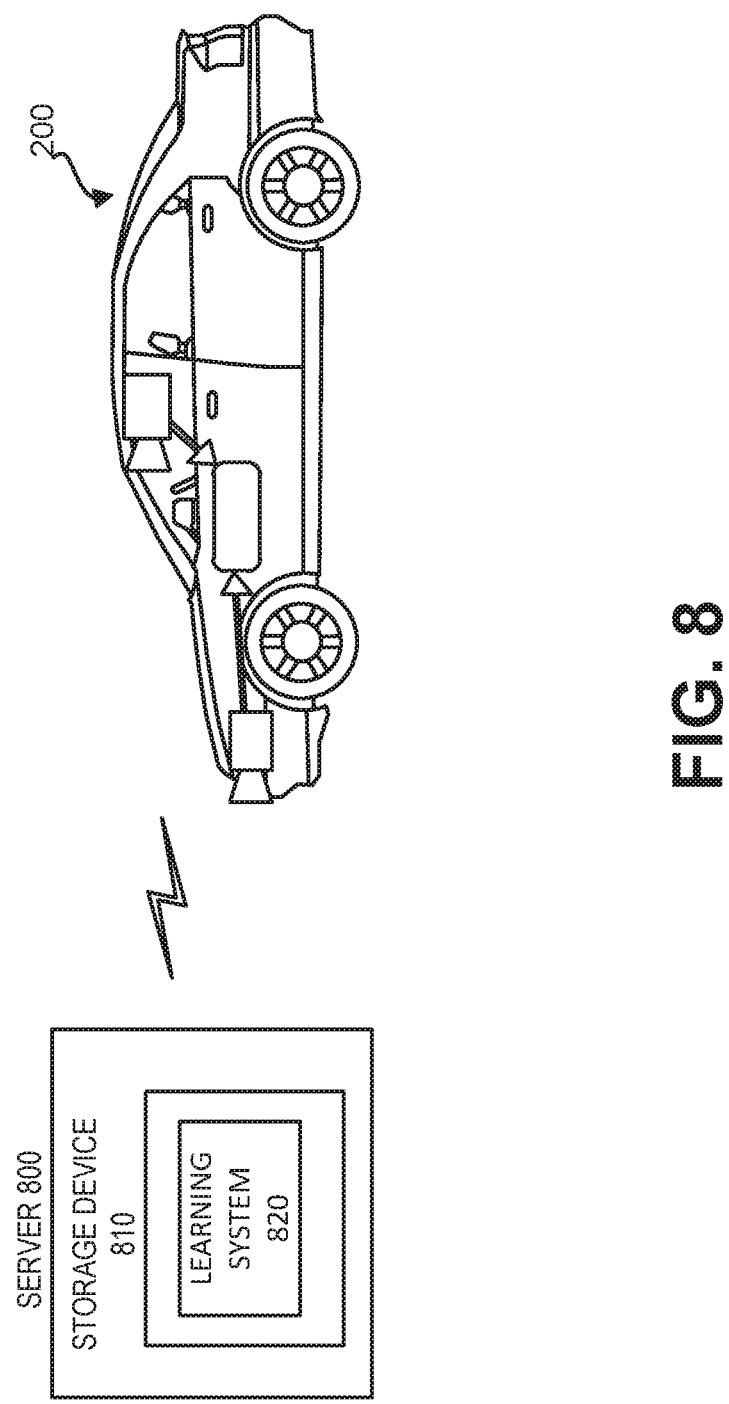
FIG. 8 is an exemplary block diagram of a remote server in communication with a vehicle, consistent with disclosed embodiments.

FIG. 8 shows an example of vehicle 200 receiving data from a remote server 800 and/or transmitting data to remove server 800, consistent with one or more disclosed embodiments. As shown in FIG. 8, remote server 800 may include a storage device 810 (e.g., a computer-readable medium) provided on remote server 800, which communicates with vehicle 200. Vehicle 200 may communicate with remote server 800 via one or more networks (e.g., over a cellular network and/or the Internet, etc.) through a wired and/or wireless communication path. In some embodiments, a processing device (e.g., processing unit 110) of vehicle 200 may receive data from remote server 800 over one or more networks.

Remote server 800 may also receive data from other vehicles configured to communicate with remote server 800. For example, in some embodiments, remote server 800 may receive image data and motion data from a plurality of vehicles. The received image data from a particular vehicle may include one or more images (or portions of one or more images) captured by one or more image capture devices included or mounted in the vehicle. The received motion data from the particular vehicle may include motion information associated with the received one or more images (or image portions). For example, the motion information may have been generated by a vehicle control system (e.g., an electronic stability control system or a suspension system), and may indicate how the particular vehicle performed or reacted when the vehicle traveled over a road surface depicted in the received one or more images.

In some embodiments, remote server 800 may include a learning system 820, such as a neural network. For example, the neural network may be configured to train a plurality of weights using at least the image data and motion data received from one or more of the plurality of vehicles. The plurality of weights may represent the strength of a plurality of connections between each nodes connected to the neural network.

In some embodiments, in addition to or as an alternative to learning system 820, remote server 800 may include a trained system, such as the trained system discussed above and a trained system 908 discussed in connection with FIG. 9 below. Accordingly, in some embodiments, functionality of learning system 820 and trained system 908 may be combined and may reside on remote server 800. In other embodiments, functionality of learning system 820 and trained system 908 may be combined and may reside on vehicle 200 (e.g., stored in memory 140 and/or 150). In yet other embodiments, components of learning system 820 and trained system 908 may be subdivided across remote server 800 and vehicle 200 (e.g., in memory 140 and/or 150).

In some embodiments, remote server 800 may also transmit update information to vehicle 200. The update information may include information determined from the analysis of the image data and the motion data received from the plurality of vehicles. In some embodiment, the at least one processing device (e.g., processing unit 110) of vehicle 200 may be programmed to receive the update information and update a trained system used by the vehicle to analyze image data and determine one or more road surface characteristics.

Figure 9:
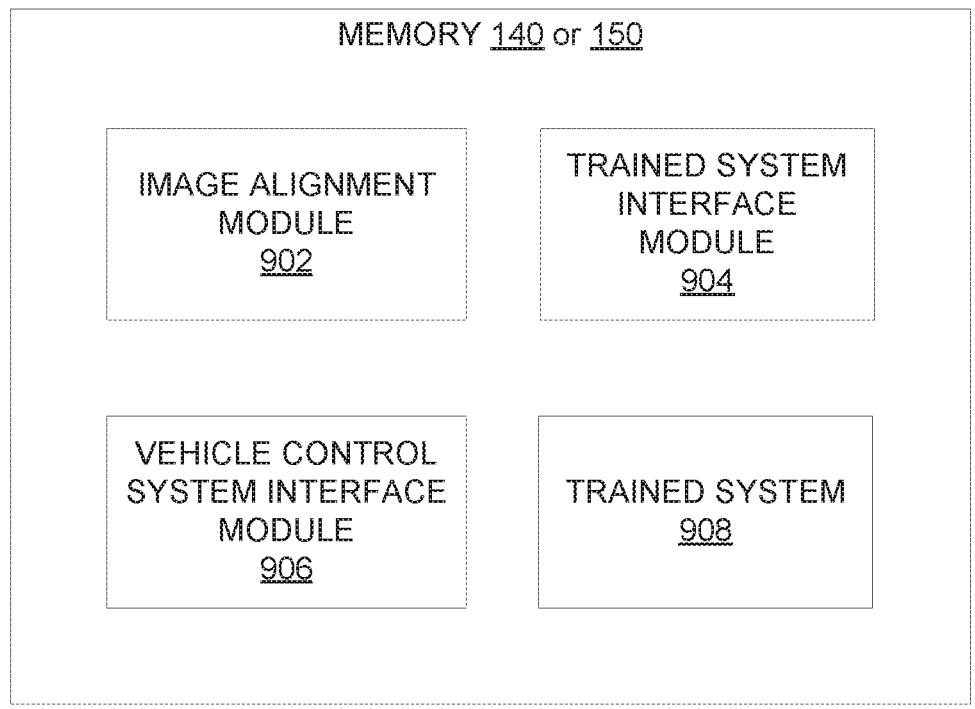
FIG. 9 is an exemplary block diagram of a memory configured to store instructions for performing one or more operations consistent with the disclose embodiments.

FIG. 9 is an exemplary functional block diagram of memory 140 and/or 150, which may store instructions for performing one or more operations consistent with the disclosed embodiments. As discussed above, although the following refers to memory 140, one of skill in the art will recognize that instructions may be stored in memory 140 and/or 150. Memory 140 may store an image alignment module 902, a trained system interface module 904, a vehicle control system interface module 906, and a trained system 908. The disclosed embodiments are not limited to any particular configuration of memory 140. Further, applications processor 180 and/or image processor 190 may execute the instructions stored in modules 902-908, and one of skill in the art will understand that references in the following discussions to processing unit 110 may refer to applications processor 180 and image processor 190 individually or collectively. Accordingly, steps of any of the disclosed processes may be performed by one or more processing devices.

Image alignment module 902 may store software instructions executable by processing unit 110 and configured to align at least two images (or at least two image portions). For example, image alignment module 902 may store software instructions for aligning at least a portion of the at least two images using estimated motion of a vehicle, as discussed above.

Trained system interface module 904 may store software instructions executable by processing unit 110 and configured to provide one or more images or one or more image portions to a trained system (e.g., trained system 908). In some embodiments, the one or more images (or image portions) may be aligned when provided to the trained system. Further, trained system interface module 904 may store software instructions executable by processing unit for receiving one or more characteristics of a road surface from the trained system.

Vehicle control system interface module 906 may store software instructions executable by processing unit 110 and configured to generate control information (e.g., a control signal) for causing a change to at least one setting of a vehicle control system. For example, using one or more determined characteristics of a road surface, vehicle control system interface module 906 may determine control information for changing at least one setting of a vehicle control system, such as suspension system 250 or electronic stability control system 260, or settings of more than one vehicle control system, as discussed above.

Memory 140 and/or 150 may further include a trained system 908. Trained system 908 may include software instructions configured to determine a characteristic of a road surface by analyzing one or more received images (or image portions), as discussed above. In some embodiments, trained system 908 may include a learning system, such as a neural network. In other embodiments, trained system 908 may receive information from a learning system, such as a neural network, external to the vehicle (e.g., from remote server 800). For example, trained system 908 may be updated based on update information received from remote server 800. As described earlier, the update information may include information determined from analysis of image data and motion data received from a plurality of vehicles.

Additionally, as discussed above, functionality of learning system 820 and trained system 908 may be combined and may reside on vehicle 200 (e.g., stored in memory 140 and/or 150), components of learning system 820 and trained system 908 may be subdivided across remote server 800 and vehicle 200 (e.g., in memory 140 and/or 150), or functionality of learning system 820 and trained system 908 may be combined and may reside on remote server 800. Additionally or alternatively, in some embodiments, image analysis of one or more images (or image portions) may be performed by executing one or more image analysis techniques, such as edge detection, image flow analysis, etc., in lieu of the use of a trained system and/or a learning system.

FIGS. 10A-10D are examples of road segments including one or more lanes and examples of different road surface characteristics, consistent with the disclosed embodiments.

Figure 10A:
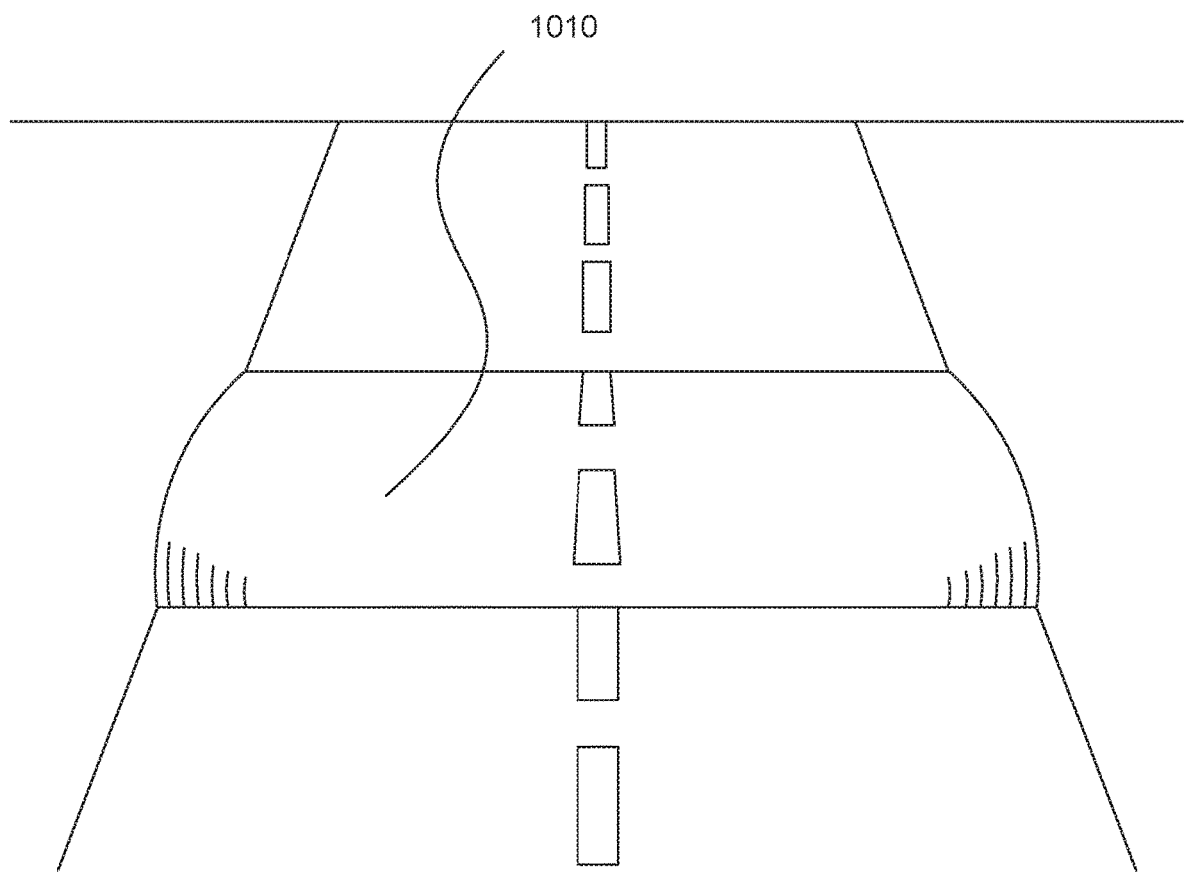
FIG. 10A is a diagrammatic representation of an example of a road surface characteristic consistent with the disclosed embodiments

As shown in FIG. 10A, road segment 1000A includes an uneven road surface 1010. System 100 may detect positive step edges of uneven road surface 1010 using edges in an image depicting uneven road surface 1010 combined with an analysis of residual motion of a stabilized road plane. For example, system 100 may detect horizontal edges in an image in the path and then fit the residual motion to two planes, on either side of the edge. This may be used to estimate the height difference in the road surface. Negative step edges during the day may be detected in the same way. At night, a dark shadow produced by the vehicle's headlights may be present in images. System 100 may further differentiate between shadow regions and actual surface characteristics, when analyzing images captured at night.

Figure 10B:
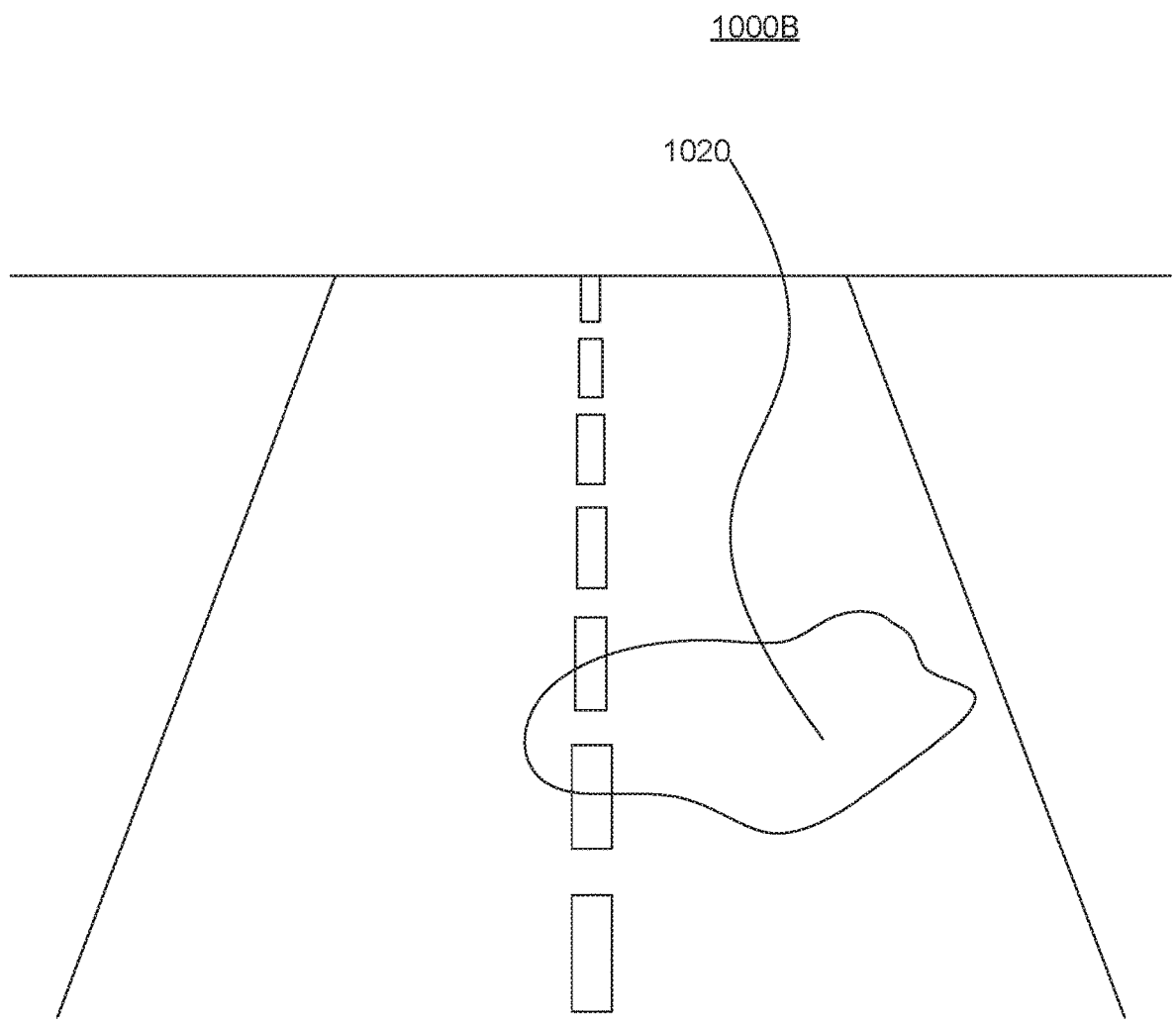
FIG. 10B is a diagrammatic representation of another example of a road surface characteristic consistent with the disclosed embodiments

As shown in FIG. 10B, road segment 1000B includes a wet surface 1020. System 100 may determine that wet surface 1020 is a reflective surface. As discussed above, one of image capture device 122, 124, and 126 (e.g., mounted at a height of 1.25 meters) may capture the environment of a vehicle (e.g., 7 meters ahead), and the wet road surface may reflect a portion of the light from the sky and from other objects in the scene. Using this information, system 100 may analyze multiple images to determine a 3D structure of the road surface.

Figure 10C:
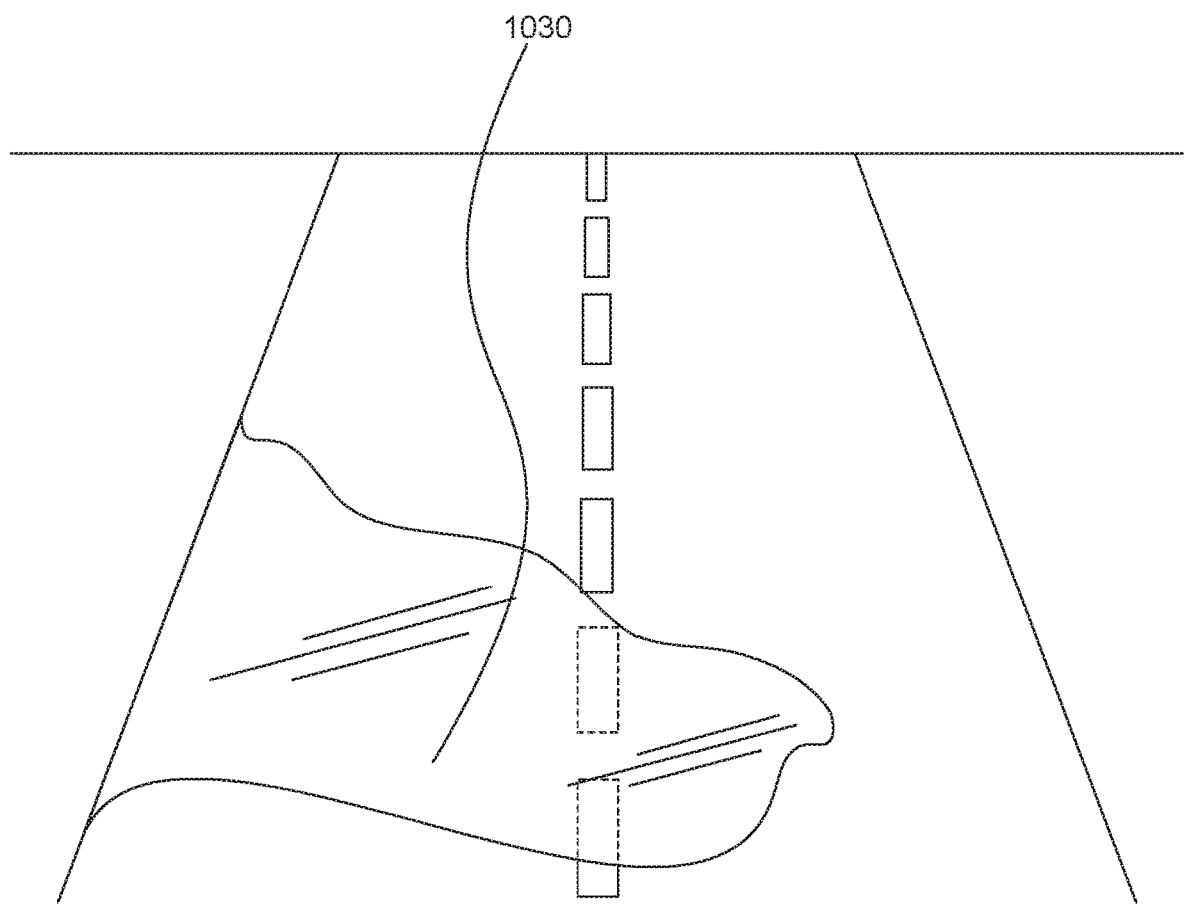
FIG. 10C is a diagrammatic representation of yet another example of a road surface characteristic consistent with the disclosed embodiments

As shown in FIG. 10C, road segment 1000C may include an icy surface 1030. System 100 may determine that icy surface 1030 may produce specular reflections covering the road texture and thus include ice. System 100 may identify icy surface 1030 through image analysis that may include detection of direct sunlight and/or vehicle headlights. As discussed above, vehicle headlights may cause bright spots of texture in the images, which may move on the surface of the road as the vehicle moves. System 100 may further make use of characteristics such as motion at day that differs from motion at night since, in the latter case, the light source (e.g., headlights) is also moving. Thus, in a high resolution image, the bright specular points may move relative to a stabilized road surface image.

Figure 10D:
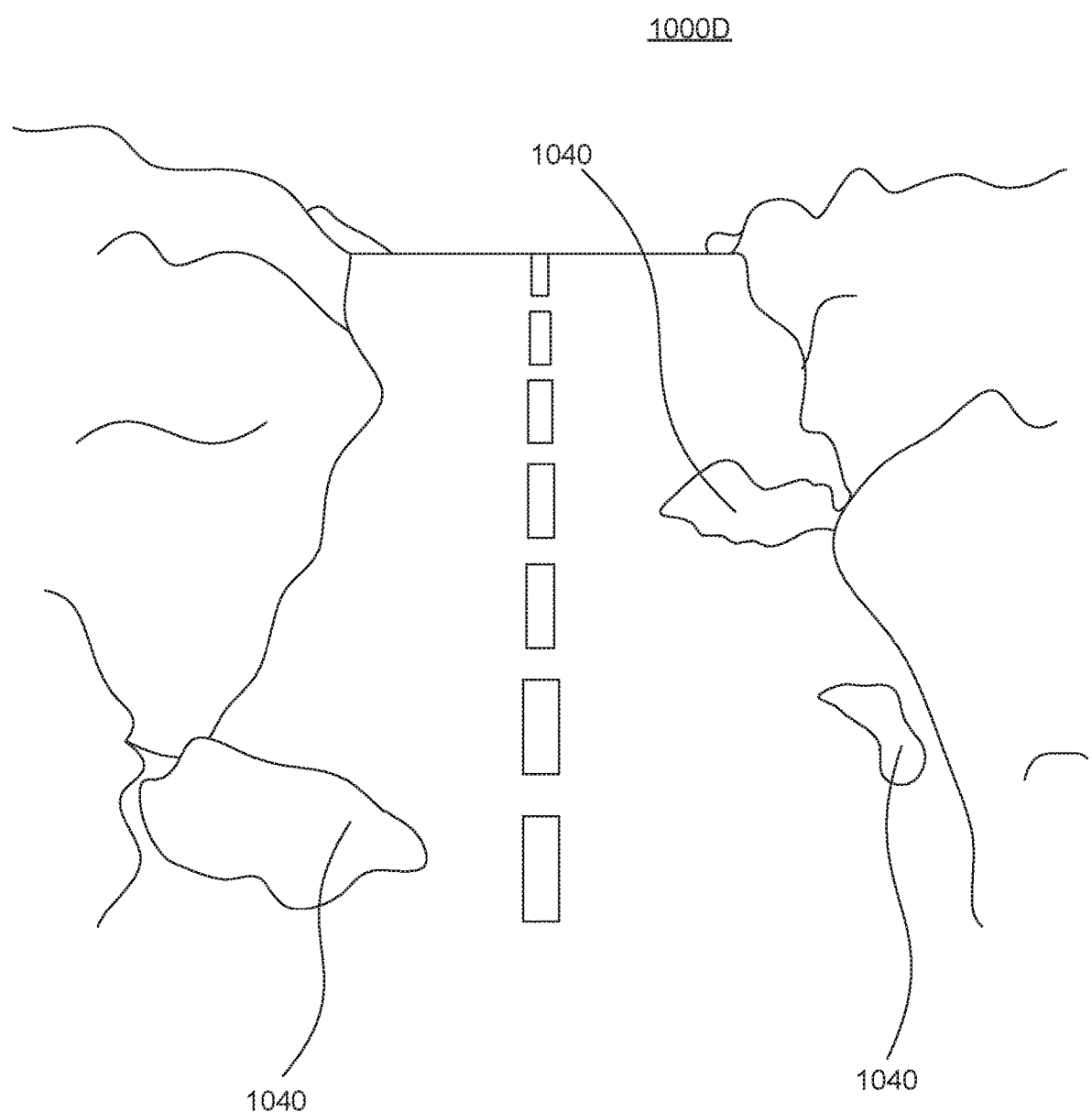
FIG. 10D is a diagrammatic representation of yet another example of a road surface characteristic consistent with the disclosed embodiments

As shown in FIG. 10D, road segment 1000D includes a snow covered surface 1040. System 100 may use color and/or texture to differentiate snow from rock salt spread on the road. In darker environments, headlights may cause small shadows on the road texture and, as a vehicle approaches road segment 1000D, these shadows may shrink in size. Accordingly, system 100 may use motion information, particularly at night, to detect one or more road surface characteristics, such as snow.

Figure 11:
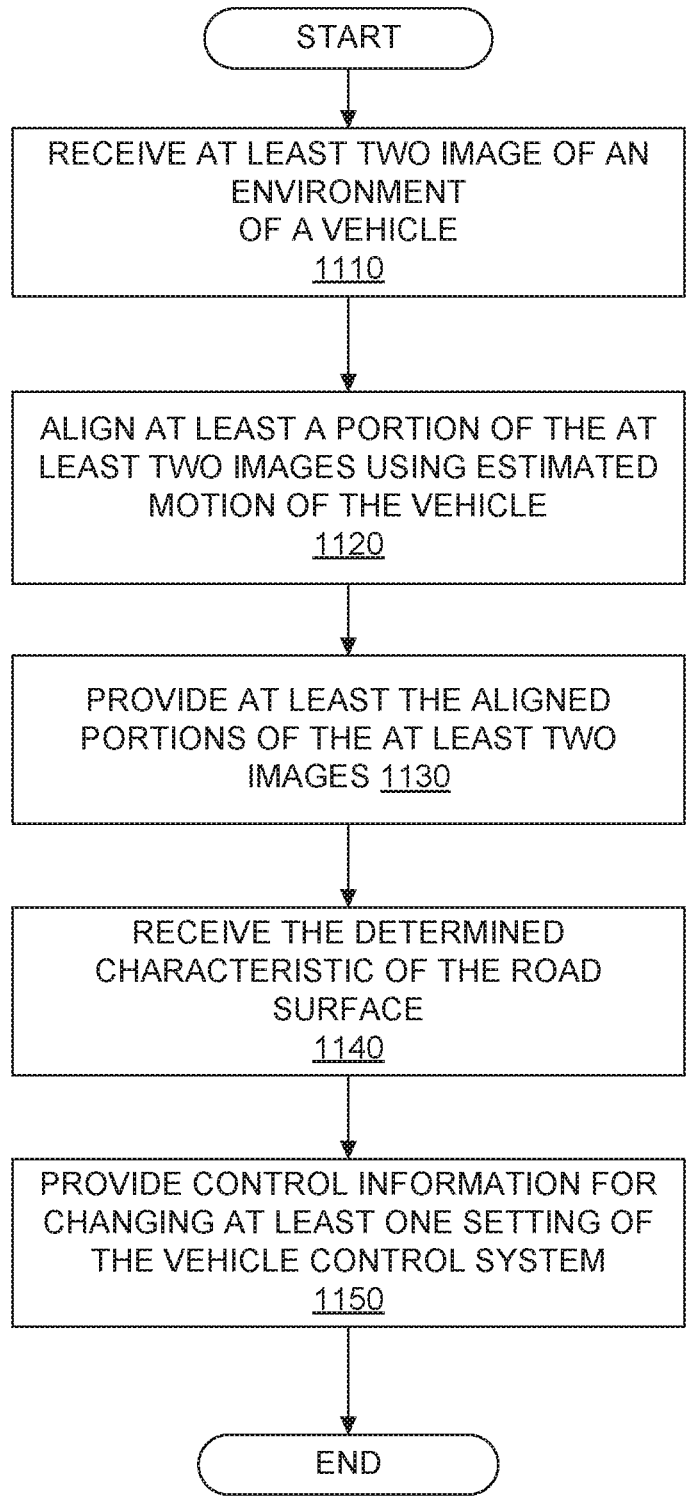
FIG. 11 is a flowchart showing an exemplary process for determining an adjustment for a control system of a vehicle consistent with the disclosed embodiments.

FIG. 11 is a flowchart illustrating an example process 1100 for determining an adjustment for a vehicle control system, consistent with disclosed embodiments. As discussed above, the vehicle control system may include an electronic stability control system or a suspension system. Process 1100 may be performed by, for example, processing unit 110 of vehicle 200.

At step 1110, processing unit 110 may receive, from at least one camera (e.g., one or more of image capture devices 122, 124, or 126), at least two images representative of an environment of a vehicle (e.g., vehicle 200). The environment of the vehicle may include a road surface ahead of the vehicle. In some embodiments, at least one of the two images may include color information.

At step 1120, processing unit 110 may align at least a portion of the at least two images using estimated motion of the vehicle. For example, processing unit 110 may execute instructions of image alignment module 902 to estimate that the vehicle has traveled a certain distance (e.g., 5 meters) between the capture of the two images and to align the images accordingly.

At step 1130, processing unit 110 may provide at least the aligned portions of the at least two images to a trained system. As discussed above, the trained system may include trained system 908 and/or learning system 820, discussed above. The trained system may be configured to determine at least one characteristic of the road surface, as discussed above, and provide the determined characteristic of the road surface to processing unit 110. Next, at step 1140, processing unit 110 may receive the determined characteristic of the road surface from the trained system.

At step 1150, processing unit 110 may provide to a vehicle control system, based on the determined characteristic of the road surface, control information for causing a change to a setting of the vehicle control system. For example, processing unit 110 may execute instructions of vehicle control system interface module 904 to determine the information for causing a change to at least one vehicle control setting of the vehicle. Further, processing unit 110 may execute instructions of vehicle control system interface module 904 to transmit one or more electronic signals to a suspension system 250 and/or electronic stability control system 260, as discussed above.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for determining an adjustment for a vehicle control system, the system comprising:
at least one processing device programmed to:
receive, from at least one camera, at least two images representative of an environment of a vehicle, the environment including a road surface ahead of the vehicle, where at least one of the two images includes color information;
align at least a portion of the at least two images using estimated motion of the vehicle;
provide, to a trained system configured to determine a characteristic of the road surface, at least the aligned portions of the at least two images, wherein the trained system is configured to determine the characteristic using the aligned portions of the at least two images;
receive, from the trained system, the determined characteristic of the road surface; and
provide, to the vehicle control system, based on at least the determined characteristic of the road surface, control information for changing at least one setting of the vehicle control system.

2. The system of claim 1, wherein the at least two images have a resolution of at least one pixel per centimeter of the road surface at a distance of at least five meters ahead of the vehicle.

3. The system of claim 1, wherein the at least two images have a resolution of at least one pixel per centimeter of the road surface at a distance of at least seven meters ahead of the vehicle.

4. The system of claim 1, wherein the image portions are from consecutive image frames.

5. The system of claim 1, wherein the image portions are from image frames that are spaced apart from one another by at least a predefined amount.

6. The system according to claim 5, wherein the image portions correspond to expected locations of the vehicle along the road which are spaced apart by a predefined distance.

7. The system according to claim 6, wherein the predefined distance is 0.5 meters to 2 meters.

8. The system of claim 1, wherein at least one of the image portions includes at least one region of the road surface on which at least one tire of the vehicle is predicted to travel.

9. The system of claim 1, wherein the trained system is included in the vehicle.

10. The system of claim 9, wherein the at least one processing device is further programmed to update the trained system using update information received from a remote server.

11. The system of claim 10, wherein the update information includes information determined from analysis of image data and motion data received from a plurality of vehicles.

12. The system of claim 11, wherein the remote server is configured to train a plurality of weights using at least the image and motion data received from the plurality of vehicles.

13. The system of claim 10, wherein the remote server includes a neural network.

14. The system of claim 1, wherein the determined characteristic of the road surface includes a roughness of the road surface.

15. The system of claim 14, wherein the road surface includes gravel, dust, dirt, cobblestones, bricks, or a smooth surface.

16. The system of claim 1, wherein the determined characteristic of the road surface includes a presence of a substance on the road surface.

17. The system of claim 16, wherein the substance includes water, ice, or snow.

18. The system of claim 1, wherein the determined characteristic of the road surface includes a texture of the road surface.

19. The system of claim 1, wherein the vehicle control system includes an electronic stability control system.

20. The system of claim 1, wherein the vehicle control system includes a suspension system.

21. The system of claim 1, wherein the estimated motion is determined based on an output of at least one sensor of the vehicle, the at least one sensor being different from the at least one camera.

22. A vehicle, the vehicle comprising:
a vehicle control system; and
at least one processing device programmed to:
receive, from at least one camera, at least two images representative of an environment of the vehicle, the environment including a road surf ace ahead of the vehicle, where at least one of the two images includes color information;
align at least a portion of the at least two images using estimated motion of the vehicle;
provide, to a trained system configured to determine a characteristic of the road surface, at least the aligned portions of the at least two images, wherein the trained system is configured to determine the characteristic using the aligned portions of the at least two images;
receive, from the trained system, the determined characteristic of the road surface; and
provide, to the vehicle control system, based on at least the determined characteristic of the road surface, control information for changing at least one setting of the vehicle control system.

23. The vehicle of claim 22, wherein the vehicle control system includes an electronic stability control system or a suspension system.

24. A method for determining an adjustment for a vehicle control system, the method comprising:
receive, from at least one camera, at least two images representative of an environment of a vehicle, the environment including a road surface ahead of the vehicle, where at least one of the two images includes color information;
align at least a portion of the at least two images using estimated motion of the vehicle;
provide, to a trained system configured to determine a characteristic of the road surface, at least the aligned portions of the at least two images, wherein the trained system is configured to determine the characteristic using the aligned portions of the at least two images;
receive, from the trained system, the determined characteristic of the road surface; and
provide, to the vehicle control system, based on at least the determined characteristic of the road surf ace, control information for changing at least one setting of the vehicle control system.

25. A non-transitory computer-readable medium storing program instructions for executing the method of claim 24.

* * * * *

UNITED STATES PATENT AND TRADEMARK OFFICE
CERTIFICATE OF CORRECTION

| | |
|---|---|
| PATENT NO. | : 10,696,227 B2 |
| APPLICATION NO. | : 15/868569 |
| DATED | : June 30, 2020 |
| INVENTOR(S) | : Gideon P. Stein |

It is certified that error appears in the above-identified patent and that said Letters Patent is hereby corrected as shown below:

In the Claims

In Claim 22, Column 42, Line 12, "road surf ace" should read --road surface--.

In Claim 24, Column 42, Line 48, "road surf ace," should read --road surface,--.

Signed and Sealed this
Twenty-eighth Day of February, 2023

Katherine Kelly Vidal
*Director of the United States Patent and Trademark Office*